US012481679B2

(12) United States Patent
Sharp et al.

(10) Patent No.: US 12,481,679 B2
(45) Date of Patent: Nov. 25, 2025

(54) SEARCHING REMOTE DATA IN AN OBSERVABILITY PIPELINE SYSTEM

(71) Applicant: Cribl, Inc., San Francisco, CA (US)

(72) Inventors: Clint Sharp, Oakland, CA (US); Dritan Bitincka, Edgewater, NJ (US); Ledion Bitincka, San Francisco, CA (US); Oliver Draese, Los Gatos, CA (US)

(73) Assignee: Cribl, Inc., San Francisco, CA (US)

( * ) Notice: Subject to any disclaimer, the term of this patent is extended or adjusted under 35 U.S.C. 154(b) by 0 days.

(21) Appl. No.: 18/321,189

(22) Filed: May 22, 2023

(65) Prior Publication Data
US 2023/0376483 A1 Nov. 23, 2023

Related U.S. Application Data

(60) Provisional application No. 63/423,264, filed on Nov. 7, 2022, provisional application No. 63/419,632, filed on
(Continued)

(51) Int. Cl.
G06F 16/28 (2019.01)
G06F 11/34 (2006.01)
(Continued)

(52) U.S. Cl.
CPC ........ *G06F 16/287* (2019.01); *G06F 11/3419* (2013.01); *G06F 16/2453* (2019.01);
(Continued)

(58) Field of Classification Search
CPC ............... G06F 16/287; G06F 16/2471; G06F 16/2453; G06F 11/3419; H04L 67/1021
See application file for complete search history.

(56) References Cited

U.S. PATENT DOCUMENTS 7,412,442 B1 8/2008 Vadon et al.
8,751,529 B2 6/2014 Zhang et al.
(Continued)

FOREIGN PATENT DOCUMENTS

WO 2023230001 11/2023
WO 2023230005 11/2023
(Continued)

OTHER PUBLICATIONS

WIPO, International Search Report and Written Opinion issued in Application No. PCT/US2023/023214 on Aug. 22, 2023, 12 pages.
(Continued)

*Primary Examiner* — Courtney Harmon
(74) *Attorney, Agent, or Firm* — Young Basile Hanlon & MacFarlane, P.C.

(57) ABSTRACT

In some aspects, search functionality is provided in an observability pipeline system. In some implementations, a method of searching remotely-stored data includes receiving a search query at a computer node residing at a node geolocation, the search query representing a request to search data stored at a storage geolocation; identifying compute geolocations each including computing resources, each of the compute geolocations being distinct from the node geolocation and the storage geolocation; obtaining latency data including latency values for the compute geolocations; selecting one of the compute geolocations based on the latency data; by operation of a coordinator agent on the computer node, initiating a dynamic computing resource at the selected compute geolocation, and receiving search results identified by the dynamic computing resource.

26 Claims, 8 Drawing Sheets

Related U.S. Application Data on Oct. 26, 2022, provisional application No. 63/414,762, filed on Oct. 10, 2022, provisional application No. 63/344,864, filed on May 23, 2022.

(51) Int. Cl.
- *G06F 16/2453* (2019.01)
- *G06F 16/2457* (2019.01)
- *G06F 16/2458* (2019.01)
- *G06F 16/248* (2019.01)
- *H04L 67/1021* (2022.01)

(52) U.S. Cl.
CPC ...... *G06F 16/2457* (2019.01); *G06F 16/2471* (2019.01); *G06F 16/248* (2019.01); *H04L 67/1021* (2013.01)

(56) References Cited

U.S. PATENT DOCUMENTS

| | | |
|---|---|---|
| 8,806,361 B1 | 8/2014 | Noel et al. |
| 8,837,360 B1 | 9/2014 | Mishra et al. |
| 9,124,612 B2 | 9/2015 | Vasan et al. |
| 9,130,971 B2 | 9/2015 | Vasan et al. |
| 9,921,733 B2 | 3/2018 | Filippi et al. |
| 10,235,460 B2 | 3/2019 | Ago et al. |
| 10,394,802 B1 | 8/2019 | Porath et al. |
| 10,515,212 B1* | 12/2019 | McClintock ............ G06F 21/57 |
| 10,599,724 B2 | 3/2020 | Pal et al. |
| 10,776,355 B1 | 9/2020 | Batsakis et al. |
| 10,984,044 B1 | 4/2021 | Batsakis et al. |
| 11,003,682 B2 | 5/2021 | Porath et al. |
| 11,003,714 B1 | 5/2021 | Batsakis et al. |
| 11,120,344 B2 | 9/2021 | Das et al. |
| 11,216,453 B2 | 1/2022 | Papale et al. |
| 11,216,511 B1 | 1/2022 | Bigdelu et al. |
| 11,250,056 B1 | 2/2022 | Batsakis et al. |
| 11,263,268 B1 | 3/2022 | Bourbie et al. |
| 11,269,476 B2 | 3/2022 | Noel et al. |
| 11,269,871 B1 | 3/2022 | Bigdelu et al. |
| 11,281,706 B2 | 3/2022 | Pal et al. |
| 11,422,686 B2 | 8/2022 | Filippi et al. |
| 11,636,128 B1 | 4/2023 | Bigdelu et al. |
| 2004/0078367 A1 | 4/2004 | Anderson et al. |
| 2006/0248073 A1 | 11/2006 | Jones et al. |
| 2008/0059899 A1 | 3/2008 | Gemmell et al. |
| 2008/0263025 A1 | 10/2008 | Koran |
| 2008/0270391 A1 | 10/2008 | Newbold et al. |
| 2008/0301106 A1 | 12/2008 | Oral et al. |
| 2009/0198596 A1 | 8/2009 | Dolan et al. |
| 2010/0322255 A1 | 12/2010 | Hao et al. |
| 2012/0317087 A1 | 12/2012 | Lymberopoulos et al. |
| 2013/0138638 A1 | 5/2013 | Karenos et al. |
| 2014/0059120 A1 | 2/2014 | Richardson et al. |
| 2015/0032728 A1* | 1/2015 | Rozich .................... G06F 16/93 707/722 |
| 2015/0242416 A1 | 8/2015 | Nakano et al. |
| 2016/0226731 A1* | 8/2016 | Maroulis ................. H04L 69/40 |
| 2018/0082410 A1 | 3/2018 | Schulte |
| 2018/0096014 A1 | 4/2018 | Bektas et al. |
| 2018/0232465 A1 | 8/2018 | Yonekawa et al. |
| 2019/0130003 A1* | 5/2019 | Maiti ................ G06F 16/24553 |
| 2020/0097481 A1* | 3/2020 | Cosentino ........... G06F 16/2423 |
| 2020/0257680 A1 | 8/2020 | Danyi et al. |
| 2021/0117425 A1 | 4/2021 | Rao et al. |
| 2021/0133650 A1 | 5/2021 | Cella et al. |
| 2021/0191740 A1* | 6/2021 | Richards ................. H04L 67/56 |
| 2021/0240703 A1 | 8/2021 | Anamanamuri et al. |
| 2021/0287156 A1 | 9/2021 | Rogynskyy et al. |
| 2021/0382964 A1 | 12/2021 | Moore et al. |
| 2022/0147000 A1 | 5/2022 | Cooley et al. |
| 2022/0191148 A1* | 6/2022 | Raindel ............... G06F 9/45558 |
| 2022/0230078 A1* | 7/2022 | Matlick .................... G06N 5/04 |
| 2023/0041129 A1 | 2/2023 | Terlecki et al. |
| 2023/0095756 A1* | 3/2023 | Wilkinson .......... H04L 63/1416 726/6 |
| 2023/0350931 A1* | 11/2023 | Lewis .................... G06F 16/338 |
| 2023/0376491 A1 | 11/2023 | Sharp et al. |
| 2023/0376498 A1 | 11/2023 | Sharp et al. |
| 2023/0376509 A1 | 11/2023 | Sharp et al. |

FOREIGN PATENT DOCUMENTS

| | | |
|---|---|---|
| WO | 2023230047 | 11/2023 |
| WO | 2023230048 | 11/2023 |

OTHER PUBLICATIONS

WIPO, International Search Report and Written Opinion issued in Application No. PCT/US2023/023213 on Aug. 22, 2023, 13 pages.
WIPO, International Search Report and Written Opinion issued in Application No. PCT/US2023/023118 on Aug. 22, 2023, 9 pages.
WIPO, International Search Report and Written Opinion issued in Application No. PCT/US2023/023123 on Aug. 22, 2023, 9 pages.
USPTO, Notice of Allowance issued in U.S. Appl. No. 18/322,048, filed Apr. 29, 2024, 25 pages.
USPTO, Non-Final Office Action issued in U.S. Appl. No. 18/321,267, filed Jul. 1, 2024, 59 pages.
International serach report for application No. 23812416.8 filed May 22, 2023; Mailed Jun. 16, 2025; 10 Pages.

\* cited by examiner

SEARCHING REMOTE DATA IN AN OBSERVABILITY PIPELINE SYSTEM

CROSS-REFERENCE TO RELATED APPLICATIONS

This application claims priority to U.S. Provisional Patent Application No. 63/344,864, filed May 23, 2022, entitled "Observability Platform Search;" U.S. Provisional Patent Application No. 63/414,762, filed Oct. 10, 2022, entitled "Observability Platform Search;" U.S. Provisional Patent Application No. 63/419,632, filed Oct. 26, 2022, entitled "Observability Platform Search;" and U.S. Provisional Application No. 63/423,264, filed Nov. 7, 2022, entitled "Observability Platform Search." Each of the above-referenced priority documents is incorporated herein by reference.

BACKGROUND

The following description relates to performing a remote search in an observability pipeline system.

Observability pipelines are used to route and process data in a number of contexts. For example, observability pipelines can provide unified routing of various types of machine data to multiple destinations while adapting data shapes and controlling data volumes. In some implementations, observability pipelines allow an organization to interrogate machine data from its environment without knowing in advance the questions that will be asked. Observability pipelines may also provide monitoring and alerting functions, which allow systematic observation of data for known conditions that require specific action or attention.

DETAILED DESCRIPTION

Figure 1:
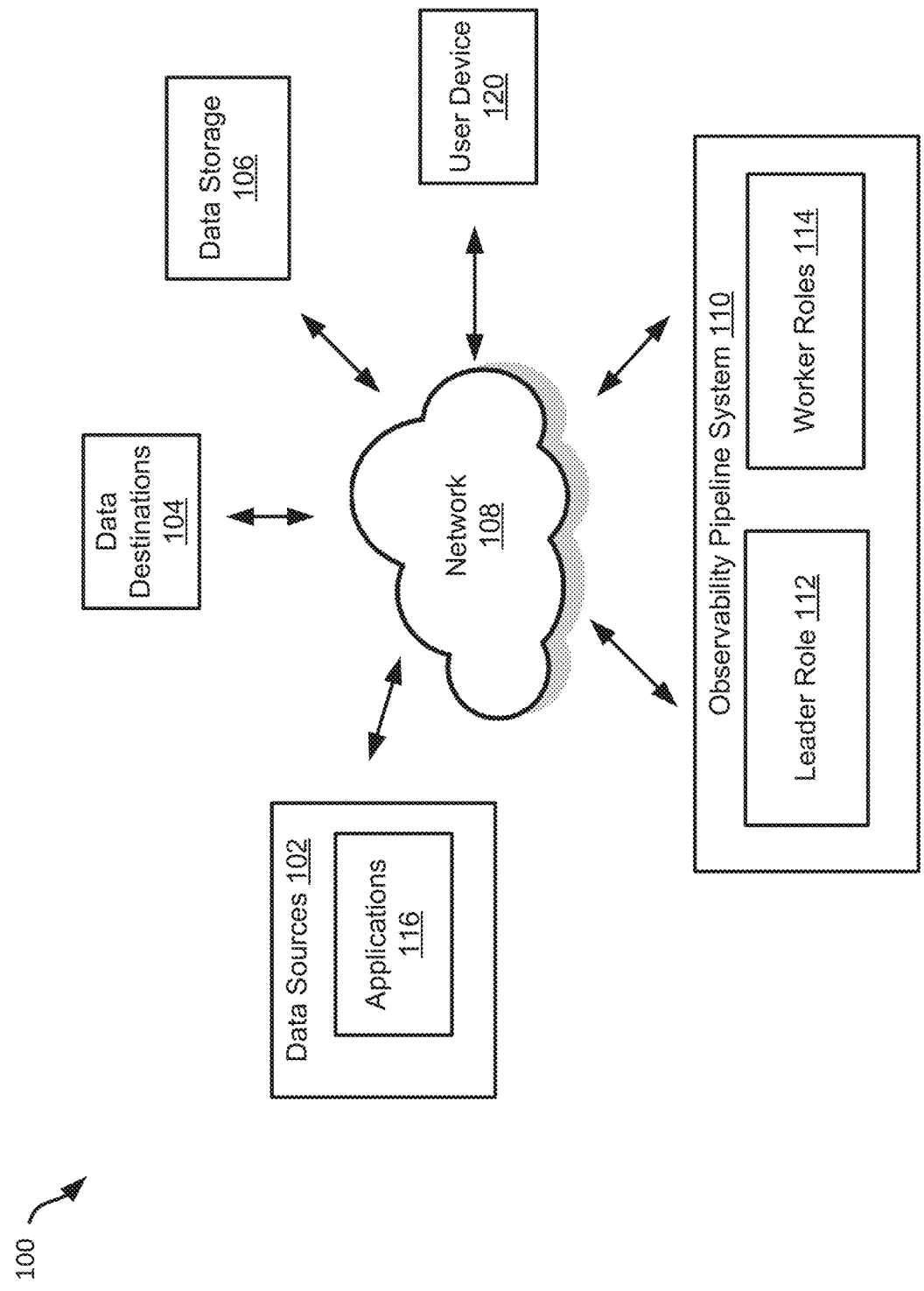
FIG. 1 is a block diagram showing aspects of an example computing environment that includes an observability pipeline system.

In some implementations, an observability pipeline system includes search functionality configured to execute search queries on data stored at remote storage locations. The search functionality can be integrated with an observability pipeline system (e.g., the observability pipeline system 110 in FIG. 1) to query data that is accessible to the observability pipeline system (e.g., observability pipeline input data, observability pipeline output data, other structured data, other machine data, or a combination these and other types of data). In some instances, a search query received at a computer node can designate a remote storage location to be searched. In some cases, the computer node can select a distinct geolocation where dynamic computing resources will be deployed to perform the search; the geolocation can be selected from multiple possible geolocations. In some cases, the geolocation is selected based on network communication efficiency between the selected geolocation and the remote storage location. For instance, the geolocation where dynamic computing resources will be deployed can be selected based on latency between involved geolocations, in addition to other factors in some cases.

In some implementations, search functionality can enable personnel (e.g., administrators, users, etc.) with a single search tool to query observability data at a remote storage geolocation without having to re-collect the observability data. In some implementations, search functionality can be performed on data at rest, that has already been collected and stored. For example, when data is already in S3 (or similar) or collected in a system of analysis (e.g., Splunk, Elastic, etc.) in an organization's observability lake or within existing systems, such data can also be queried. In some instances, the data to be queried can include structured, semi-structured, and unstructured data. The search functionality can be performed based on any terms, patterns, value/pairs, and any data type. In some implementations, the search functionality can vastly increase the scope of analysis without requiring the cost or complexity of first shipping, ingesting, and storing the data. In some implementations, search functionality is not restricted to a single location, a single bucket, or a single vendor platform for the data.

The systems and techniques described here can provide technical advantages and improvements over existing technologies. As an example, search functionality provided in an observability pipeline system can allow enterprise computer systems to extract value from observability pipeline systems more efficiently while conserving computing resources. This can improve accessibility to data in lakes, S3, the edge, etc. Search functionality may require minimal setup to use and no extra infrastructure. In some cases, the S3 data set provider can connect to S3 buckets by assuming an AWS role with read permissions, allowing the search of AWS service logs or any data stored in S3 without needing to index or move all the data. Search functionality can quickly scale to provide ephemeral on-demand compute to handle large search jobs and scale back once complete. Search language may be based on Kusto Query Language or another query language or dialect. In some implementations, the techniques described here can increase the efficiency of a search process, improve the utilization of computing resources, decrease the time required to obtain search results, or provide a combination of these and other advantages. For instance, a dynamic computing resource that has higher network communication efficiency with a data storage location can be configured to search data stored at the data storage location; the higher network communication efficiency can improve overall search efficiency and search time. In some cases, latency data for multiple compute geolocations can be analyzed to determine an improved or optimal geolocation for performing a particular search query. Accordingly, aspects of the systems and techniques described here can be used to improve the operation of computer systems, information and data management systems, observability pipeline systems, and other classes of technology.

FIG. 1 is a block diagram showing aspects of an example computing environment 100 that includes an observability pipeline system 110. In addition to the observability pipeline system 110, the example computing environment 100 shown in FIG. 1 includes data sources 102, data destinations 104, data storage 106, network 108, and a user device 120. The data sources 102 includes an application 116 which is configured to produce source data. The computing environment 100 may include additional or different features, and the elements of the computing environment 100 may be configured to operate as described with respect to FIG. 1 or in another manner.

In some implementations, the computing environment 100 contains the computing infrastructure of a business enterprise, an organization or another type of entity or group of entities. During operation, various data sources 102 in an organization's computing infrastructure produce volumes of machine data that contain valuable or useful information. These data sources can include applications 116 and other types of computer resources. The machine data may include data generated by the organization itself, data received from external entities, or a combination. By way of example, the machine data can include network packet data, sensor data, application program data, observability data, and other types of data. Observability data can include, for example, system logs, error logs, stack traces, system performance data, or any other data that provides information about computing infrastructure and applications (e.g., performance data and diagnostic information). The observability pipeline system 110 can receive and process the machine data generated by the data sources 102. For example, the machine data can be processed to diagnose performance problems, monitor user interactions, and to derive other insights about the computing environment 100. Generally, the machine data generated by the data sources 102 does not have to use a common format or structure, and the observability pipeline system 110 can generate structured output data having a specified form, format, or type. The output generated by the observability pipeline system can be delivered to data destinations 104, data storage 106, or both. In some cases, the data delivered to the data storage 106 includes the original machine data that was generated by the data sources 102, and the observability pipeline system 110 can later retrieve and process the machine data that was stored on the data storage 106.

In general, the observability pipeline system 110 can provide several services for processing and structuring machine data for an enterprise or other organization. In some instances, the observability pipeline system 110 provides schema-agnostic processing which can include, for example, enriching, aggregating, sampling, suppressing, or dropping fields from nested structures, raw logs, and other types of machine data. The observability pipeline system 110 may also function as a universal adapter for any type of machine data destination. For example, the observability pipeline system 110 may be configured to normalize, de-normalize, and adapt schemas for routing data to multiple destinations. The observability pipeline system 110 may also provide protocol support, allowing enterprises to work with existing data collectors, shippers, and agents, and providing simple protocols for new data collectors. In some cases, the observability pipeline system 110 can test and validate new configurations and reproduce how machine data was processed. The observability pipeline system 110 may also have responsive configurability, including rapid reconfiguration to selectively allow more verbosity with pushdown to data destinations or collectors. The observability pipeline system 110 may also provide reliable delivery (e.g., at least once delivery semantics) to ensure data integrity.

The data sources 102, data destinations 104, data storage 106, observability pipeline system 110, and the user device 120 are each implemented by one or more computer systems that have computational resources (e.g., hardware, software, firmware) that are used to communicate with each other and to perform other operations. For example, each computer system may be implemented as the example computer system 700 shown in FIG. 7 or components thereof. In some implementations, computer systems in the computing environment 100 can be implemented in various types of devices, such as, for example, laptops, desktops, workstations, smartphones, tablets, sensors, routers, mobile devices, Internet of Things (IoT) devices, and other types of devices. Aspects of the computing environment 100 can be deployed on private computing resources (e.g., private enterprise servers, etc.), cloud-based computing resources, or a combination thereof. Moreover, the computing environment 100 may include or utilize other types of computing resources, such as, for example, edge computing, fog computing, etc.

The data sources 102, data destinations 104, data storage 106, observability pipeline system 110, and the user device 120 and possibly other computer systems or devices communicate with each other over the network 108. The example network 108 can include all or part of a data communication network or another type of communication link. For example, the network 108 can include one or more wired or wireless connections, one or more wired or wireless networks, or other communication channels. In some examples, the network 108 includes a Local Area Network (LAN), a Wide Area Network (WAN), a private network, an enterprise network, a Virtual Private Network (VPN), a public network (such as the Internet), a peer-to-peer network, a cellular network, a Wi-Fi network, a Personal Area Network (PAN) (e.g., a Bluetooth low energy (BTLE) network, a ZigBee network, etc.) or other short-range network involving machine-to-machine (M2M) communication, or another type of data communication network.

The data sources 102 can include multiple user devices, servers, sensors, routers, firewalls, switches, virtual machines, containers, or a combination of these and other types of computer devices or computing infrastructure components. The data sources 102 detect, monitor, create, or otherwise produce machine data during their operation. The machine data is provided to the observability pipeline system 110 through the network 108. In some cases, the machine data is streamed to the observability pipeline system 110 as pipeline input data.

The data sources 102 can include data sources designated as push sources (examples include Splunk TCP, Splunk HEC, Syslog, Elasticsearch API, TCP JSON, TCP Raw, HTTP/S, Raw HTTP/S, Kinesis Firehose, SNMP Trap, Metrics, and others), pull sources (examples include Kafka, Kinesis Streams, SQS, S3, Google Cloud Pub/Sub, Azure Blob Storage, Azure Event Hubs, Office 365 Services, Office 365 Activity, Office 365 Message Trace, Prometheus, and others), and other types of data sources. The data sources 102 can also include other applications 116.

In the example shown in FIG. 1, the application 116 includes a collection of computer instructions that constitute a computer program. The computer instructions reside in memory 720 and execute on a processor 710. The computer instructions can be compiled or interpreted. An application 116 can be contained in a single module or can be statically or dynamically linked with other libraries. The libraries can be provided by the operating system or the application provider.

The data destinations 104 can include multiple user devices, servers, databases, analytics systems, data storage systems, or a combination of these and other types of computer systems. The data destinations 104 can include, for example, log analytics platforms, time series databases (TSDBs), distributed tracing systems, security information and event management (SIEM) or user behavior analytics (UBA) systems, and event streaming systems or data lakes (e.g., a system or repository of data stored in its natural/raw format). The pipeline output data produced by the observability pipeline system 110 can be communicated to the data destinations 104 through the network 108.

The data storage 106 can include multiple user devices, servers, databases, hosted services, or a combination of these and other types of data storage systems. Generally, the data storage 106 can operate as a data source or a data destination (or both) for the observability pipeline system 110. In some examples, the data storage 106 includes a local or remote filesystem location, a network file system (NFS), Amazon S3 buckets, S3-compatible stores, other cloud-based data storage systems, enterprise databases, systems that provide access to data through REST API calls or custom scripts, or a combination of these and other data storage systems. The pipeline output data, which may include the machine data from the data sources 102 as well as data analytics and other output from the observability pipeline system 110, can be communicated to the data storage 106 through the network 108.

The observability pipeline system 110 may be used to monitor, track, and triage events by processing the machine data from the data sources 102. The observability pipeline system 110 can receive an event data stream from each of the data sources 102 and identify the event data stream as pipeline input data to be processed by the observability pipeline system 110. The observability pipeline system 110 generates pipeline output data by applying observability pipeline processes to the pipeline input data and communicates the pipeline output data to the data destinations 104. In some implementations, the observability pipeline system 110 operates as a buffer between data sources and data destinations, such that all data sources send their data to the observability pipeline system 110, which handles filtering and routing the data to proper data destinations.

In some implementations, the observability pipeline system 110 unifies data processing and collection across many types of machine data (e.g., metrics, logs, and traces). The machine data can be processed by the observability pipeline system 110 by enriching it and reducing or eliminating noise and waste. The observability pipeline system 110 may also deliver the processed data to any tool in an enterprise designed to work with observability data. For example, the observability pipeline system 110 may analyze event data and send analytics to multiple data destinations 104, thereby enabling the systematic observation of event data for known conditions that require attention or other action. Consequently, the observability pipeline system 110 can decouple sources of machine data from data destinations and provide a buffer that makes many, diverse types of machine data easily consumable.

In some example implementations, the observability pipeline system 110 can operate on any type of machine data generated by the data sources 102 to properly observe, monitor, and secure the running of an enterprise's infrastructure and applications 116 while minimizing overlap, wasted resources, and cost. Specifically, instead of using different tools for processing different types of machine data, the observability pipeline system 110 can unify data collection and processing for all types of machine data (e.g., logs 204, metrics 206, and traces 208 shown in FIG. 2) and route the processed machine data to multiple data destinations 104. Unifying data collection can minimize or reduce redundant agents with duplicate instrumentation and duplicate collection for the multiple destinations. Unifying processing may allow routing of processed machine data to disparate data destinations 104 while adapting data shapes and controlling data volumes.

In an example, the observability pipeline system 110 obtains DogStatsd metrics, processes the DogStatsd metrics (e.g., by enriching the metrics), sends processed data having high cardinality to a first destination (e.g., Honeycomb), and processed data having low cardinality to a second, different destination (e.g., Datadog). In another example, the observability pipeline system 110 obtains windows event logs, sends full fidelity processed data to a first destination (e.g., an S3 bucket), and sends a subset (e.g., where irrelevant events are removed from the full fidelity processed data) to one or more second, different destinations (e.g., Elastic and Exabeam). In another example, machine data is obtained from a Splunk forwarder and processed (e.g., sampled). The raw processed data may be sent to a first destination (e.g., Splunk). The raw processed data may further be parsed, and structured events may be sent to a second destination (e.g., Snowflake).

The example observability pipeline system 110 shown in FIG. 1 includes a leader role 112 and multiple worker role 114. The leader role 112 leads the overall operation of the observability pipeline system 110 by configuring and monitoring the worker roles 114; the worker roles 114 receive event data streams from the data sources 102 and data storage 106, apply observability pipeline processes to the event data, and deliver pipeline output data to the data destinations 104 and data storage 106.

The observability pipeline system 110 may deploy the leader role 112 and a number of worker roles 114 on a single computer node or on many computer nodes. For example, the leader role 112 and one or more worker roles 114 may be deployed on the same computer node. Or in some cases, the leader role 112 and each worker role 114 may be deployed on distinct computer nodes. The distinct computer nodes can be, for example, distinct computer devices, virtual machines, containers, processors, or other types of computer nodes.

The user device 120, the observability pipeline system 110, or both, can provide a user interface for the observability pipeline system 110. Aspects of the user interface can be rendered on a display (e.g., the display 750 in FIG. 7) or otherwise presented to a user. The user interface (e.g., the example user interfaces 600, 610 in FIGS. 6A-6B, or other types of user interfaces) may be generated by an observability pipeline application that interacts with the observability pipeline system 110. The observability pipeline application can be deployed as software that includes application programming interfaces (APIs), graphical user interfaces (GUIs), and other modules.

In some implementations, an observability pipeline application can be deployed as a file, executable code, or another type of machine-readable instructions executed on the user device 120. The observability pipeline application, when executed, may render GUIs for display to a user (e.g., on a touchscreen, a monitor, or other graphical interface device), and the user can interact with the observability pipeline application through the GUIs. Certain functionality of the observability pipeline application may be performed on the user device 120 or may invoke the APIs, which can access functionality of the observability pipeline system 110. The observability pipeline application may be rendered and executed within another application (e.g., as a plugin in a web browser), as a standalone application, or otherwise. In some cases, an observability pipeline application may be deployed as an installed application on a workstation, as an "app" on a tablet or smartphone, as a cloud-based application that accesses functionality running on one or more remote servers, or otherwise.

In some implementations, the observability pipeline system 110 is a standalone computer system that includes only a single computer node. For instance, the observability pipeline system 110 can be deployed on the user device 120 or another computer device in the computing environment 100. For example, the observability pipeline system 110 can be implemented on a laptop or workstation. The standalone computer system can operate as the leader role 112 and the worker roles 114 and may execute an observability pipeline application that provides a user interface as described above. In some cases, the leader role 112 and each of the worker roles 114 are deployed on distinct hardware components (e.g., distinct processors, distinct cores, distinct virtual machines, etc.) within a single computer device. In such cases, the leader role 112 and each of the worker roles 114 can communicate with each other by exchanging signals within the computer device, through a shared memory, or otherwise.

In some implementations, the observability pipeline system 110 is deployed on a distributed computer system that includes multiple computer nodes. For instance, the observability pipeline system 110 can be deployed on a server cluster, on a cloud-based "serverless" computer system, or another type of distributed computer system. The computer nodes in the distributed computer system may include a leader node operating as the leader role 112 and multiple worker nodes operating as the respective worker roles 114. One or more computer nodes of the distributed computer system (e.g., the leader node) may communicate with the user device 120, for example, through an observability pipeline application that provides a user interface as described above. In some cases, the leader node and each of the worker nodes are distinct computer devices in the computing environment 100. In some cases, the leader node and each of the worker nodes can communicate with each other using TCP/IP protocols or other types of network communication protocols transmitted over a network (e.g., the network 108 shown in FIG. 1) or another type of data connection.

In some implementations, the observability pipeline system 110 is implemented by software installed on private enterprise servers, a private enterprise computing device, or other types of enterprise computing infrastructure (e.g., one or more computer systems owned and operated by corporate entities, government agencies, other types of enterprises). In such implementations, some or all of the data sources 102, data destinations 104, data storage 106, and the user device 120 can be or include the enterprise's own computer resources, and the network 108 can be or include a private data connection (e.g., an enterprise network or VPN). In some cases, the observability pipeline system 110 and the user device 120 (and potentially other elements of the computer environment 100) operate behind a common firewall or other network security system.

In some implementations, the observability pipeline system 110 is implemented by software running on a cloud-based computing system that provides a cloud hosting service. For example, the observability pipeline system 110 may be deployed as a SaaS system running on the cloud-based computing system. For example, the cloud-based computing system may operate through Amazon® Web Service (AWS) Cloud, Microsoft Azure Cloud, Google Cloud, DNA Nexus, or another third-party cloud. In such implementations, some or all of the data sources 102, data destinations 104, data storage 106, and the user device 120 can interact with the cloud-based computing system through APIs, and the network 108 can be or include a public data connection (e.g., the Internet). In some cases, the observability pipeline system 110 and the user device 120 (and potentially other elements of the computer environment 100) operate behind different firewalls, and communication between them can be encrypted or otherwise secured by appropriate protocols (e.g., using public key infrastructure or otherwise).

In some implementations, search functionality is available through the cloud-based computing system and is provided by the observability pipeline system 110. In some instances, no additional search agent is required to perform search actions. For search-at-rest (e.g., searching data stored in AWS S3 buckets), a search process can automatically launch "executor" processes to perform the query locally. The search functionality of the observability pipeline system 110 may be performed according to a leader-to-worker node/edge node control protocol, or another type of control protocol.

In some implementations, search functionality is bounded by groups to support role-based access control, application of computing resources, and other functions. A search functionality can be specified in a query. A search source can be defined by one or more datasets, referenced in the query. In certain instances, the number of search sources can be defined in the query by the number of datasets or search strings.

In some implementations, operators that are supported by search functionality of the observability pipeline system 110 may include: Cribl—(Default) Custom Cribl operator—Simplifies locating specific events; Search—Locates specific events with specific text strings; Where—Filters events based on a Boolean expressions; Project—Define columns used to display results; Extend—Calculates one or more expressions and assigns the results to fields; Find—Locates specific events; Timestats—Aggregates events by time periods or bins; Extract—Extracts information from a field either via parser or regular expression; Summarize—Produces a table that aggregates the content of the input table; Limit (alias Take)—Defines the number of results to return; and other operators that enable other query capabilities. In some instances, other operators and functions may also be supported by the observability pipeline system 110.

In some implementations, search functionality supports multiple functions, including Cribl, Content, Scalar, Statistical and other function types. In some instances, different functions are available in a search language help tab of the user interface of the search functionality to define syntax, rules and provide examples for all Operators and Functions. In some instances, search recommendations may be included in the search functionality, e.g., default search settings, sample search queries, etc. The user interface of the search functionality may also include a history tab for displaying previous search queries. In some implementations, the search functionality supports complex search queries that includes multiple datasets, terms, Boolean logic, etc. These search terms or expressions can be grouped as a single search string. Wildcards may be supported for query bar terms and datasets.

In some cases, during operation, personnel (e.g., system administrators) can connect their user interface to the cloud-based computing system. A search window may appear on the user interface of the search functionality as a peer to the observability pipeline system 110. Data to query can be identified, which can be accomplished via datasets in a query or in another manner. In some contexts, a dataset is an addressable set of data defined in the query at various locations including endpoint nodes, S3 buckets, etc. Predefined datasets can be included in the search functionality, providing the ability to query state information of the observability pipeline system 110 as well as the filesystem of endpoint nodes. These include dataset definitions for leader nodes, endpoint nodes, filesystems, and S3. In some cases, administrators can define and configure their own datasets. In some implementations, the dataset model includes Name the Dataset—any unique identifier; Apply Dataset Provider—Identify external system (e.g., edge node, S3 Bucket, etc.); and Apply Dataset Provider Type—this identifies the schema (e.g., Cribl, Filesystem, S3, etc.).

In some instances, a search bar at the user interface of the search functionality can be configured to identify query values. Search functionality may support all personas, as a result the query expression can be simple terms or more complex literals, regexes, JavaScript expressions, etc. In some implementations, data to be queried is identified; and one or more datasets are defined. In some implementations, the search bar at the user interface of the search functionality includes "type-ahead" capability for syntax completion and query history. For example, by just typing "Dat." the look ahead capability can provide a list of available datasets. In some implementations, the query operators are defined. Functions, terms, strings, and other query operators can be defined in a query and separated by a "I" (pipe).

In certain instances, one or more time ranges for queries can be defined. The one or more time ranges may include real-time windows—seconds, minutes, hours, days; specific time range, e.g., Mar. 20, 2022: 06:00-06:30; or others. A search process can be performed according to the query. Discovery data can be returned as part of the search results as line items in table format, charts, or in another manner. The search results can be shaped and discovered data can be aggregated as part of the query (e.g., Project, Extend, Summarize operators) or afterwards with charting options. In some implemented, different chart types, color palettes, axis settings, legends to manipulate how results are displayed can be selected or defined/configured by the user. In some examples, the number of search results are limited by the query language, including time range. In certain examples, a number of results returned can also be constrained via the "Limit" operator (e.g., Limit 100 or another number).

In some cases, a search query can specify a location of data to be searched. For example, the search query can indicate or otherwise represent a request to search data stored at a storage location (e.g., the location of any of the data destinations 104, the location of any data storage 106, etc.). The storage location can be specified by a name (e.g., "EnterpriseData1", "DataCenter834", etc.), by a geographical location or region (e.g., "Ashburn, VA"; "US East"; "North America"; etc.), by an IP address or other identifier, or the storage location can be specified in another manner. The search query can implicitly or explicitly represent the location to be searched. For instance, the search query may include an explicit indication of a location to be searched (e.g., based on data entered or selected in a user interface), or the location to be searched may be specified implicitly based on the context of the search query (e.g., search history, etc.), the type of data being searched, etc.

In some cases, search functionality may allow users to tune the scope of the query as wide or narrow by specifying constraints within the search itself. For example, a "wide" query can specify a search for instances of 'error' on any workgroup or fleet (which may include a group of devices, equipment, computers, or nodes within a small network); a "narrow" query can specify a search for instances of 'error' on host: xyx, in: Var/log directory; or a query can be anywhere in between the wide and narrow queries based on rules.

In some instances, the search functionality can query data from specific third-party vendor platforms. Third-party search functions and the search functionality of the observability pipeline system 110 work independently. Administrators may use search results from the search functionality of the observability pipeline system 110 to apply additional configurations to their existing systems and/or configure. The observability pipeline system 110 can forward discovered data or other search results to the third-party systems or platforms. When accessing external data stores (e.g., AWS S3), the search functionality can define authentication rights when the specific dataset is defined.

In some implementations, a search query is generated at the user device 120 based on user input. For instance, the search query may be generated based on search terms entered by a user through a user interface provided by a web browser or other application running on the user device 120. The search query represents a request to search for data that meets specified criteria; for instance, the search query may include search operators that specify target values of parameters. In some examples, a search operator may specify a target value for event type, event time, event origin, event source, system state context, or other parameters. When the user device 120 receives or otherwise obtains search results for the search query, the search results can be displayed to the user. For instance, the search results may be displayed in a user interface provided by a web browser or other application running on the user device 120.

In some implementations, the search query is received by an agent of the observability pipeline system 110 (e.g., an agent running at the user device 120, on a server, in the cloud or elsewhere), and the agent can dispatch the search query to an appropriate resource in the observability pipeline system 110. The agent may dispatch the search query to one or more computer resources, computer systems, or locations associated with the data to be searched. For instance, a search query may be dispatched to a resource, system or location associated with a data source 102, a data destination 104, a data storage 106. Accordingly, the observability pipeline system 110 can perform the search at an endpoint node, on a server, on a cloud-based storage facility, or elsewhere.

In some implementations, a search is performed by configuring and executing an observability pipeline process. For example, an observability pipeline process (e.g., the observability pipeline process 200 shown in FIG. 2) can be configured to perform a search according to a search query. Configuring an observability pipeline process can include selecting, defining or configuring any aspect or feature of the observability pipeline process. For example, configuring the observability pipeline process may include selecting a source that will provide input data for the observability pipeline process, selecting a destination where the output data from the observability pipeline process will be sent, configuring a pipeline engine (e.g., by selecting and applying configuration settings to routes and pipelines) that will process the data. In some examples, the pipelines or aspects of a pipeline engine can include filters that are configured based on the search query. For instance, a pipeline can be configured to select events according to a search operator, for example, events that match a target value for event type, event time, event origin, event source, etc. In some examples, the data source for the observability pipeline process is defined based on the search query. For instance, if a search query specifies a device or application to be searched, the data source for the observability pipeline process can be defined as the specified device or application. In some examples, the data destination for the observability pipeline process is defined based on the search query. For instance, the agent that dispatched the search query can be defined as the data destination for the observability pipeline process.

Figure 2:
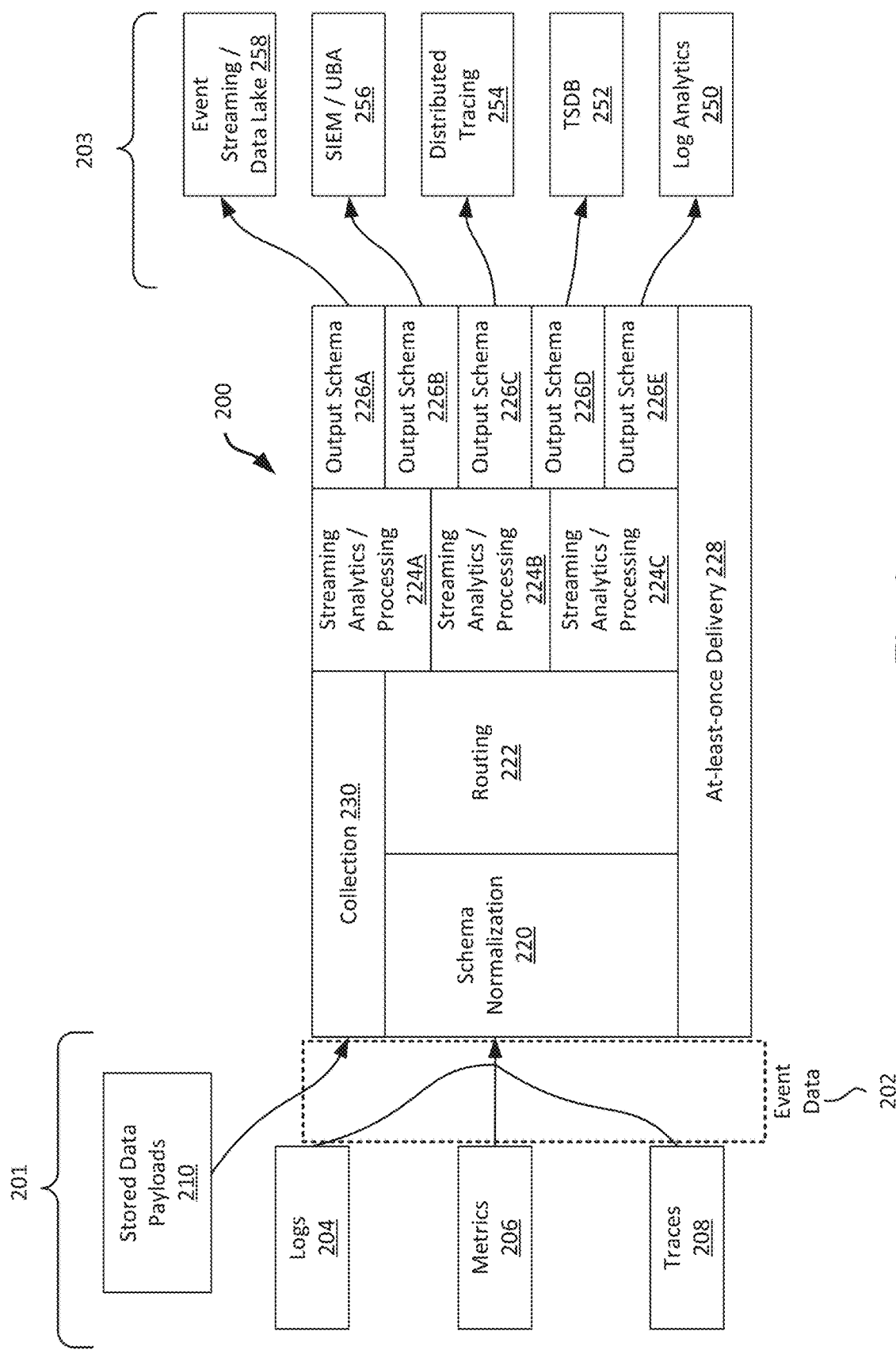
FIG. 2 is a block diagram showing aspects of an example observability pipeline system deployed in a worker role.

FIG. 2 is a block diagram showing aspects of an example observability pipeline process 200 that can be applied in an observability pipeline system. For example, the observability pipeline process 200 may be performed by one or more of the data sources 102, data destinations 104, data storage 106, and worker roles 114 shown in FIG. 1 or in another observability pipeline system. In some cases, the observability pipeline process 200 can be configured to perform a search, for example, based on a search query.

The example observability pipeline process 200 shown in FIG. 2 includes data collection 230, schema normalization 220, routing 222, streaming analytics and processing 224A, 224B, 224C, and output schematization 226A, 226B, 226C, 226D, 226E. The observability pipeline process 200 may include additional or different operations, and the operations of the observability pipeline process 200 may be performed as described with respect to FIG. 2 or in another manner. In some cases, one or more of the operations can be combined, or an operation can be divided into multiple sub-processes. Certain operations may be iterated or repeated, for example, until a terminating condition is reached.

As shown in FIG. 2, the observability pipeline process 200 is applied to pipeline input data 201 from data sources, and the observability pipeline process 200 delivers pipeline output data 203 to data destinations. The data sources can include any of the example data sources 102 or data storage 106 described with respect to FIG. 1, and the data destinations can include any of the example data destinations 104 or data storage 106 described with respect to FIG. 1.

The example pipeline input data 201 shown in FIG. 2 includes logs 204, metrics 206, traces 208, stored data payloads 210, and possibly other types of machine data. In some cases, some or all of the machine data can be generated by agents (e.g., Fluentd, Collectd, OpenTelemetry) that are deployed at the data sources, for example, on various types of computing devices in a computing environment (e.g., in the computing environment 100 shown in FIG. 1, or another type of computing environment). The logs 204, metrics 206, and traces 208 can be decomposed into event data 202 that are consumed by the observability pipeline process 200. In some instances, logs 204 can be converted to metrics 206, metrics 206 can be converted to logs 204, or other types of data conversion may be applied.

In the example shown, the stored data payloads 210 represent event data retrieved from external data storage systems. For instance, the stored data payloads 210 can include event data that an observability pipeline process previously provided as output to the external data storage system.

The event data 202 are streamed to the observability pipeline process 200 for processing. Here, streaming refers to a flow of data, which is distinct from batching or batch processing. With streaming, data are processed as they flow through the system, e.g., continuously (as opposed to batching, where individual batches are collected and processed as discrete units). As shown in FIG. 2, the event data from the logs 204, metrics 206, and traces 208 are streamed directly to the schema normalization process (at 220) without use of the collection process (at 230), whereas the event data from the stored data payloads 210 are streamed to the collection process (at 230) and then streamed to the schema normalization process (at 220), the routing process (at 222) or the streaming analytics and processing (at 224).

In some instances, event data 202 represents events as structured or typed key value pairs that describe something that occurred at a given point in time. For example, the event data 202 can contain information in a data format that stores key-value pairs for an arbitrary number of fields or dimensions, e.g., in JSON format or another format. A structured event can have a timestamp and a "name" field. Instrumentation libraries can automatically add other relevant data like the request endpoint, the user-agent, or the database query. In some implementations, components of the events data 202 are provided in the smallest unit of observability (e.g., for a given event type or computing environment). For instance, the event data 202 can include data elements that provide insight into the performance of the computing environment 100 to monitor, track, and triage incidents (e.g., to diagnose issues, reduce downtime, or achieve other system objectives in a computing environment).

In some instances, logs 204 represent events serialized to disk, possibly in several different formats. For example, logs 204 can be strings of text having an associated timestamp and written to a file (often referred to as a flat log file). The logs 204 can include unstructured logs or structured logs (e.g., in JSON format). For instance, log analysis platforms store logs as time series events, and the logs 204 can be decomposed into a stream of event data 202.

In some instances, metrics 206 represent summary information about events, e.g., timers or counters. For example, a metric can have a metric name, a metric value, and a low cardinality set of dimensions. In some implementations, metrics 206 can be aggregated sets of events grouped or collected at regular intervals and stored for low cost and fast retrieval. The metrics 206 are not necessarily discrete and instead represent aggregates of data over a given time span. Types of metric aggregation are diverse (e.g., average, total, minimum, maximum, sum-of-squares), but metrics typically have a timestamp (representing a timespan, not a specific time); a name; one or more numeric values representing some specific aggregated value; and a count of how many events are represented in the aggregate.

In some instances, traces 208 represent a series of events with a parent/child relationship. A trace may provide information about an entire user interaction and may be displayed in a Gantt-chart-like view. For instance, a trace can be a visualization of events in a computing environment, showing the calling relationship between parent and child events, as well as timing data for each event. In some implementations, individual events that form a trace are called spans. Each span stores a start time, duration, and an identification of a parent event (e.g., indicated in a parent-id field). Spans without an identification of a parent event are rendered as root spans.

The example pipeline output data 203 shown in FIG. 2 include data formatted for log analytics platforms (250), data formatted for time series databases (TSDBs) (252), data formatted for distributed tracing systems (254), data formatted for security information and event management (SIEM) or user behavior analytics (UBA) systems 256, and data formatted for event streaming systems or data lakes 258 (e.g., a system or repository of data stored in its natural/raw format). Log analytics platforms are configured to operate on logs to generate statistics (e.g., web, streaming, and mail server statistics) graphically. TSDBs operate on metrics; for example, TSDBs include Round Robin Database (RRD), Graphite's Whisper, and OpenTSDB. Tracing systems operate on traces to monitor complex interactions, e.g., interactions in a microservice architecture. SIEMs provide realtime analysis of security alerts generated by applications and network hardware. UBA systems detect insider threats, targeted attacks, and financial fraud. Pipeline output data 203 may be formatted for, and delivered to, other types of data destinations in some cases.

In the example shown in FIG. 2, the observability pipeline process 200 includes a schema normalization module that (at 220) converts the various types of event data 202 to a common schema or representation to execute shared logic across different agents and data types. For example, machine data from various agents such as Splunk, Elastic, Influx, and OpenTelemetry have different opinionated schemas, and the schema normalization module can convert the event data to normalized event data. Machine data intended for different destinations may need to be processed differently. Accordingly, the observability pipeline process 200 includes a routing module that (at 222) routes the normalized event data (e.g., from the schema normalization module 220) to different processing paths depending on the type or content of the event data. The routing module can be implemented by having different streams or topics. The routing module routes the normalized data to respective streaming analytics and processing modules. FIG. 2 shows three streaming analytics and processing modules, each applied to normalized data (at 224A, 224B, 224C); however, any number of streaming analytics and processing modules may be applied. Each of the streaming analytics and processing modules can aggregate, suppress, mask, drop, or reshape the normalized data provided to it by the routing module. The streaming analytics and processing modules can generate structured data from the normalized data provided to it by the routing module. The observability pipeline process 200 includes output schema conversion modules that (at 226A, 226B, 226C, 226D, 226E) schematize the structured data provided by the streaming analytics and processing modules. The structured data may be schematized for one or more of the respective data destinations to produce the pipeline output data 203. For instance, the output schema conversion modules may convert the structured data to a schema or representation that is compatible with a data destination. In some implementations, the observability pipeline process 200 includes an at-least-once delivery module that (at 228) applies delivery semantics that guarantee that a particular message can be delivered one or more times and will not be lost. In some implementations, the observability pipeline process 200 includes an alerting or centralized state module, a management module, or other types of sub-processes.

In the example shown in FIG. 2, the observability pipeline process 200 includes a collection module that (at 230) collects filtered event data from stored data payloads 210. For example, the stored data payloads 210 may represent event data that were previously processed and stored on the event streaming/data lake 258 or event data that were otherwise stored in an external data storage system. For example, some organizations have a high volume of data that is kept in storage systems (e.g., S3, Azure Blob Store, etc.) for warehousing purposes, or they may have event data that can be scraped from a REST endpoint (e.g., Prometheus). The collection module may allow organizations to apply the observability pipeline process 200 to data from storage, REST endpoints, and other systems regardless of whether the data has been processed by an observability pipeline system in the past. The data collection module can retrieve the data from the stored data payload 210 on the external data storage system, stream the data to the observability pipeline process 200 (e.g., via the schema normalization module, the routing module, or a streaming analytics and processing module), and send the output to any of the data destinations 230.

Figure 3:
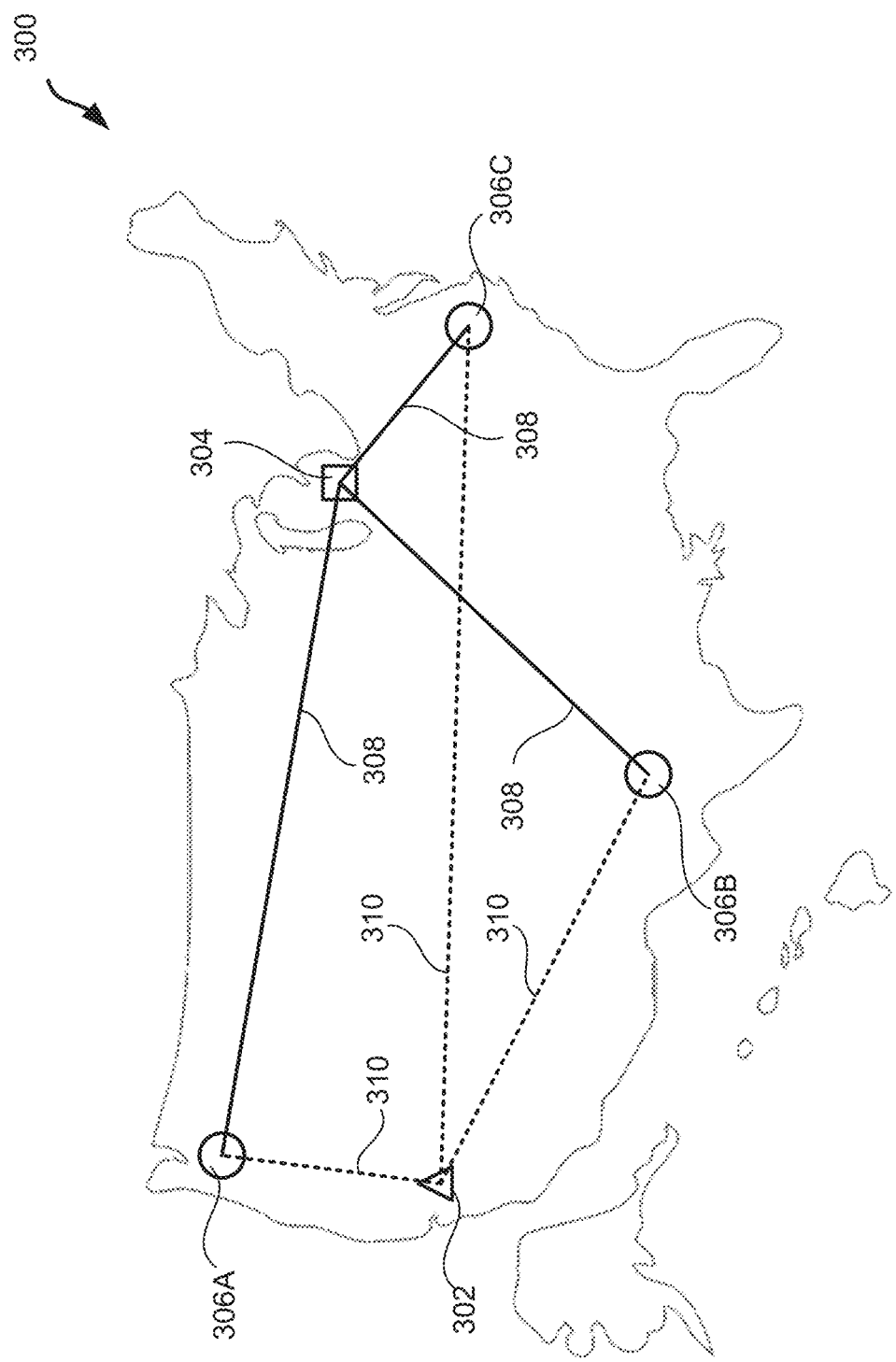
FIG. 3 is a schematic diagram showing aspects of an observability pipeline system.

FIG. 3 is a schematic diagram showing aspects of an example observability pipeline system 300. The example observability pipeline system 300 is illustrated in FIG. 3 in the context of a geographical map that includes a node geolocation 302, a storage geolocation 304, and three compute geolocations 306A, 306B, 306C. Although the geographical map in FIG. 3 shows example locations in the United States, the observability pipeline system 300 can generally be deployed in any combination of countries, regions, or locations; for instance, the node geolocation, storage geolocation, and compute geolocations may be distributed across multiple continents or. In some instances, the observability pipeline system 300 includes computing resources residing at one or more of the node geolocation 302, the storage geolocation 304, and the compute geolocations 306A, 306B, 306C; the computing resources at each location can communicate with each other through communication links provided by one or more networks. In particular, the storage geolocation 304 is communicably connected to the compute geolocations 306 through communication links 308; and the node geolocation 302 is communicably connected to the compute geolocations 306 through respective communication links 310. In some examples, geolocations may be arranged and communicably connected by additional, redundant, or different communication links. In some instances, the respective nodes at the respective geolocations in the example observability pipeline system 300 are configured to perform operations of the example processes 400, 500 in FIGS. 4 and 5.

In some implementations, the node geolocation 302 includes a computer node, which may be a computer node of the observability pipeline system 110 in FIG. 1. The computer node at the node geolocation 302 can receive a search query, for example, through a user interface of the computer node, through a communication interface of the computer node, from a memory device, or otherwise. In some cases, the search query is received from a user device (e.g., the user device 120 through the network 108 in FIG. 1). In some instances, the computer node (or a user device) may include an observability pipeline application which provides an interface for receiving search queries. In the example shown, the search query represents a request to search data stored at the storage geolocation 304. In some implementations, the stored data at the storage geolocation 304 includes machine data, unstructured data or observability pipeline input data that has been collected and stored without significant processing. In some implementations, the stored data at the storage geolocation 304 includes structured data or observability pipeline output data that has been collected and processed by the observability pipeline system or other data processing systems. For instance, the storage geolocation 304 may include any of the data destinations 104 or data storage 106 shown in FIG. 1, and the stored data can include any of the pipeline input data 201 or pipeline output data 203 shown in FIG. 2.

In some instances, the computer node at the node geolocation 302 communicates with the other nodes at distinct geolocations. For example, the computer node at the node geolocation 302 is configured to obtain network communication latency data for the nodes at the compute geolocations 306A, 306B, 306C; communicate the received search query or parts of it to at least one node at the respective compute geolocations 306A, 306B, 306C via the respective communication links 310; and receive search results from the identified at least one node at the respective compute geolocations 306A, 306B, 306C via the respective communication links 310. In some instances, the search results may be presented on the user interface of the computer node at the node geolocation 302 or communicated to the user device. In other instances, the received, potentially partial, results may require further processing at the node geolocation 302.

In some implementations, the storage node at the storage geolocation 304 includes memory units, or other types of data storage units configured to store data. Data stored at the storage geolocation 304 may include structured or unstructured data, such as, for example, observability pipeline output data generated by an observability pipeline system (e.g., the observability pipeline system 110 shown in FIG. 1), or pipeline input data (e.g., the pipeline input data 201 shown in FIG. 2). The data stored at the storage geolocation 304 may include untransformed observability data which is not yet processed by an observability pipeline system. The storage geolocation 304 includes a cloud-based data storage system. In some instances, a storage node is a physical server with one or more hard-disk drives (HDDs) or solid-state drives (SDDs). A storage node can also be a virtual machine or virtual LUN with access to one or more HDDs and/or SSDs. For example, the storage geolocation may be an AWS server. In some instances, the storage geolocation 304 does not include computing resources that are available (for performing a data search) to the observability pipeline system 300.

In some implementations, each of the compute geolocations 306A, 306B, 306C includes computing resources that are available and addressable by the computer node at the node geolocation 302. In some instances, the compute geolocations 306A, 306B, 306C may be identified by the observability pipeline system 300. For example, the nodes at the compute geolocations 306A, 306B, 306C can be identified according to their availability or other parameters. In some instances, the nodes might be generally available as "public addressable compute resources", for example as published by public cloud providers; can be dedicated, private processing resources that need to be registered to the node geolocation 302 to be usable, or in another manner. In some implementations, the compute geolocations 306A, 306B, 306C are distinct from the node geolocation 302 and the storage geolocation 304.

In some implementations, each of the nodes at the compute geolocations 306A, 306B, 306C communicates with the node at the storage geolocation 304 via the respective communication links 308. In some implementations, latency data, indicative of a network communication latency, including a latency value for each compute geolocation 306A, 306B, 306C to this storage geolocation 304 may be obtained. The latency data may be obtained from a database (e.g., a public or private database), determined dynamically, or determined by and stored at each node at the respective compute geolocation 306A, 306B, 306C. In some instances, the latency value for each compute geolocation represents an efficiency of network communication between the node at the storage geolocation 304 and a node at the respective compute geolocation. For example, latency data may include delay times, round-trip ping times, distances, or some other proxy for communication efficiency. The latency data of the compute geolocations 306A, 306B, 306C may be previously obtained by and stored at the node geolocation 302. In some instances, the latency data may be updated; and the updated latency data may be obtained by the computer node at the node geolocation 302 from the compute geolocations 306A, 306B, 306C via the respective communication links 310.

In some implementations, the computer node at the node geolocation 302 is configured to select one of the compute geolocations 306A, 306B, 306C based on the latency data; a particular compute geolocation may be selected to optimal search efficiency (e.g., optimal relative to the other available compute geolocations). For example, the computer node at the node geolocation 302 may select the compute geolocation 306C based on the distance between the storage geolocation 304 and the compute geolocation 306C (e.g., the shortest distance). The distance between two geolocations can represent the geographic distance, for example, based on Global Positioning System (GPS) coordinates or other types of geographic information, resulting in the most efficient transfer of data between storage location 304 and compute geolocation. For another example, the computer node at the node geolocation 302 may select the compute geolocation 306B based on the delay time for communicating data between the storage geolocation 304 and the compute geolocation 306B (e.g., the shortest delay time). The delay time between two geolocations can represent an amount of time required to send a message (e.g., a standard message over a communication link) between the two geolocations; for instance, the round-trip ping time may represent the amount of time needed for a ping signal to travel from a computer device in one geolocation to a computer device in another geolocation and then back again. In some instances, a computer geolocation may be selected in another manner, for example, based on pricing models or a combination of these and other factors.

In some implementations, the computer node at the node geolocation 302 includes a coordinator agent. In some instances, the coordinator agent is configured to perform functions such as planning and coordination of the complete distributed search request, including the determination of the optimal (located) compute geolocations or other functions. In some instances, a coordinator agent includes available information to determine the optimal selection of access path, available resources, and required operations. In some implementations, the coordinator agent on the computer node at the node geolocation 302 is configured to initiate a dynamic computing resource at the selected compute geolocation (e.g., the compute geolocation 306C); and transmit the search query to the dynamic computing resource at the selected compute geolocation.

In some implementations, the dynamic computing resource at the selected compute geolocation execute the search query or parts of the search query received from the coordinator agent (at the node geolocation 302) to perform a search on the stored data (at the storage geolocation 304). In some implementations, the dynamic computing resource at the selected compute geolocation is configured to generate the search results at the selected compute geolocation based on performing a remote read of the data stored at the storage geolocation 304. When a remote read is performed, the dynamic computing resource sends a remote read command from the selected compute geolocation to the storage geolocation 304, and in response, receives data from the storage geolocation; the dynamic compute resource can then locally search and process (for example, filter, project, transform, etc.) the data received from the storage geolocation. In some instances, the dynamic computing resource at the selected compute geolocation can be configured to generate the search results based on the search query in another manner. The coordinator agent at geolocation 302 might need to perform further processing on partial results delivered by any of the compute resources at the geolocations 306. In some instances, a single query can use compute resources across multiple distinct geolocations, for example to read data from different storage locations by using compute geolocations 306A and 306B.

In some implementations, the dynamic computing resource that executes the search query at the selected compute geolocation can include, for example, a Lambda, an on-demand container, a region-specific pre-warmed resource, or another type of computing resource. Lambdas or serverless functions are code deployments that do not require the proactive deployment or reservation of compute resources in a specific compute geolocation. Lambdas can be triggered by specific events (e.g., changes to a database, new files uploaded to storage, API requests, etc.), and they can be implemented in a serverless or cloud-based computing system. On-demand containers can also be implemented in a serverless or cloud-based computing system for short-lived, event-driven workloads. On-demand containers are containers that can be created and initiated on-demand, for example, in response to specific events, and then terminated when the workload has been processed. Region-specific pre-warmed resources are computing resources of a serverless or cloud-based computing system that have been pre-provisioned and pre-configured to reduce startup time and delays (e.g., to eliminate delays associated with cold starting the resources). In some cases, utilizing pre-provisioned and pre-configured resources can provide faster and more efficient search functionality.

In some implementations, the dynamic computing resource at the selected compute geolocation is configured to transmit the generated, in some cases partial, search results to the coordinator agent at the node geolocation 302; the search results (or at least a portion of them) can then be further processed and/or stored locally at the node geolocation 302 and presented on the user interface. The search results may be displayed by the computer node, for example, on a display device or user device associated with the computer node. In some instances, the computer node at the node geolocation 302 may communicate the search results to the user device from which the search query is received or other destinations so that the search results may be presented in a user interface.

In some instances, raw observability data, observability pipeline input data, or observability pipeline output data can spread across multiple regions or geographic locations at different data storage geolocations. A search query received at the node geolocation 302 may include a request for search data that is stored at multiple storage geolocations 304. In this case, the search query may be executed according to the multiple storage geolocations. The computer node at the node geolocation 302 may identify a set of compute geolocations 306 for each of the multiple storage geolocations 304. In some examples, the multiple storage geolocations 304 may share the same compute geolocations 306; or each set of the multiple storage geolocations 304 may have a distinct set of compute geolocations 306. The computer node at the node geolocation 302 may further select one compute geolocation from each of the sets of compute geolocations 306 for performing a search at respective storage geolocation 304; identify dynamic computing resources at the selected compute geolocations for executing the search query; search the stored data at the respective storage geolocations 304; and receive search results from the dynamic computing resources of the selected compute geolocations 306.

In some implementations, the search results received from the selected compute geolocation 306 are stored locally at the node geolocation 302. After receiving the search results from the execution of one or more previous search queries, a new search query can be received at the node geolocation 302; or a new search query in an existing query queue may be processed at the node geolocation 302. The new search query may be received from a user device based on input received through the user interface. The computer node at the node geolocation 302 is configured to determine whether the new search query is a refinement of at least one of the prior search queries. In response to detecting that the new search query is a refinement of one of the prior search queries, a local analysis of previously executed query plans, stored on the computer node at the node geolocation 302 can be performed. For example, the new search query may be executed locally at the node geolocation 302; and the search results from the determined one of the prior search queries can be searched, by operation of the computer node at the node geolocation 302 to generate new search results. In some implementations, the new search results present a subset or aggregation of the search results based on the determined one of the prior search queries.

In some instances, subsequent search queries can be performed iteratively to refine the search results. In this case, the subsequent search queries may include one or more refinement criteria to a prior search query. For example, a new search query is obtained for each iteration of the iterative refinement process. Upon determining the new search query for the iteration includes a refinement criterion to a prior search query, a local search on the computer node at the node geolocation 302 is performed on the data (e.g., prior search results) generated from the execution of the prior search query and stored locally on the computer node at the node geolocation 302 to produce new search results for the iteration. The new search results are a subset of the prior search results based on the prior search query. The new search results are saved locally on the node geolocation 302, which can be further used in later search iterations, for example, when the search results are not outdated or within the same user session.

Figure 4:
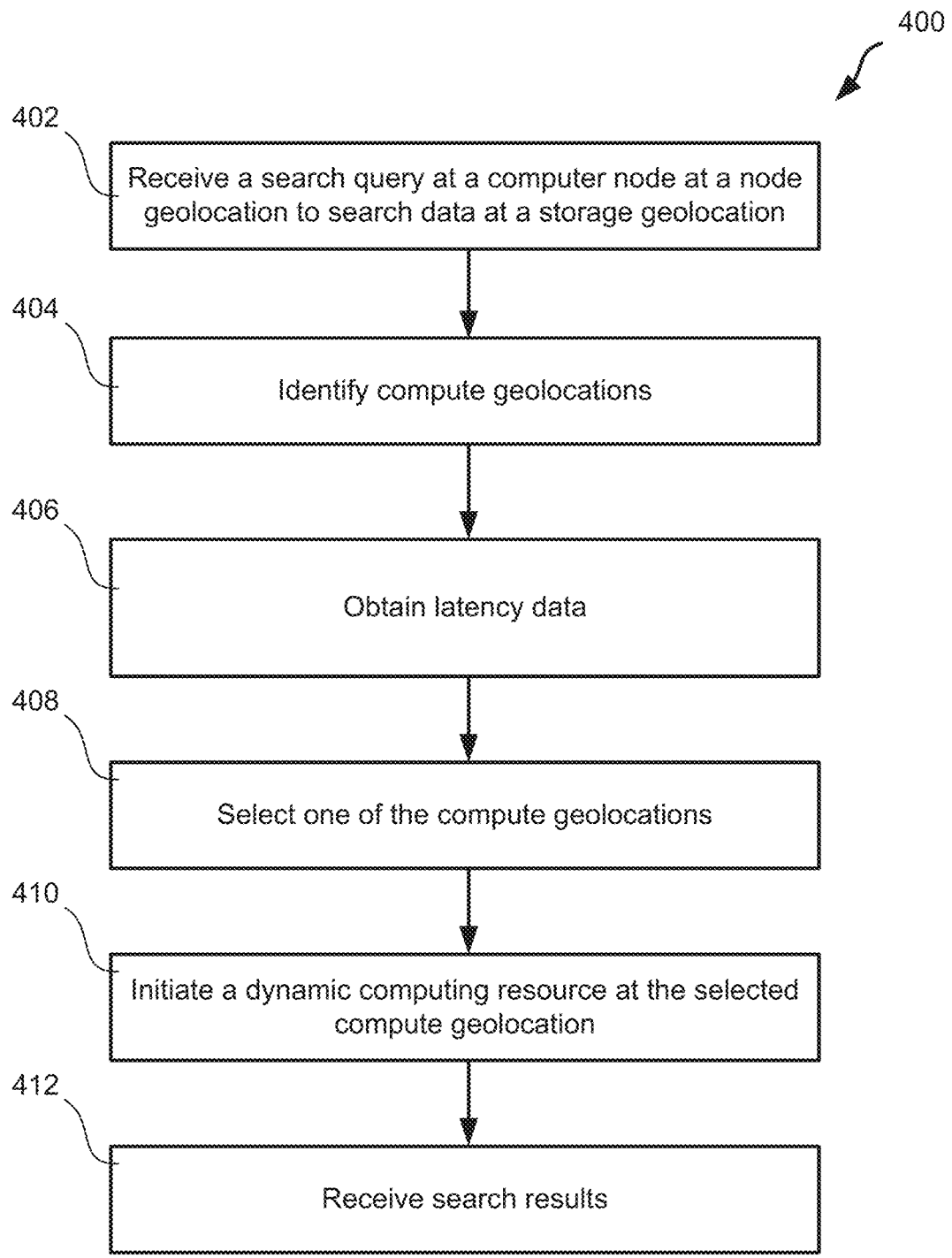
FIG. 4 is a flow chart showing aspects of an example search process.

FIG. 4 is a flow chart showing aspects of an example search process 400. In some implementations, the operations of the example process 400 are performed by operation of a computer node residing at a node geolocation. For example, the computer node may be implemented as the computer node at the node geolocation 302 communicably connected to other nodes residing at distinct geolocations 304, 306 in the example observability pipeline system 300. The example process 400 may include additional or different operations, including operations performed by additional or different components, and the operations may be performed in the order shown or in another order.

The example process 400 shown in FIG. 4 can deploy search computation to a compute geolocation close to data storage locations (e.g., the storage geolocation 304). Such deployment can keep data-heavy operations close to the data source, allowing data to remain distributed, thus reducing cost and latency on data transportation. The example process 400 may provide additional advantages and improvements in some cases.

At 402, a search query is received by a computer node. The computer node may be part of a cloud-based observability pipeline system residing at a node geolocation (e.g., the node geolocation 302 as shown in FIG. 3), and the search query may be received from a user device or a user interface of the computer node. In some implementations, the search query specifies one or more search criteria (e.g., filters), location information of data (e.g., bucket name, object-store prefix, access permissions, etc.), and other information. The search query requests information about data stored at a data storage location (e.g., at a data center or another type of data storage system), distinct from the node geolocation of the computer node. In some implementations, the computer node at the node geolocation identifies the storage geolocation based on the search query.

In certain instances, the search query may request information about data stored at multiple data storage locations (e.g., the storage geolocation 304) at multiple storage geolocations (e.g., multiple distinct data centers residing at different locations across a region or across the world). In this case, the multiple storage geolocations may be identified by the computer node. In some implementations, the stored data includes observability pipeline output data generated by an observability pipeline system (e.g., the example pipeline output data 203 shown in FIG. 2) before the search query was generated, observability pipeline input data (e.g., the pipeline input data 201 shown in FIG. 2), or other data. In some implementations, the stored data includes raw, unstructured, and yet unprocessed observability data collected by the observability pipeline system before the search query was generated, or a combination of the these.

In some implementations, the search query specifies a time period as a filter criterion. For example, a time period may be a period when the data was created, a time when the event occurred, or another time period. The time period may be defined by number of seconds, number of minutes, number of hours, number of days, all events, a user defined time period (during a specific data and time range), or the time period may be defined in another manner. In some implementations, the search query includes one or more search operators. Data flows from one operator to the next and events are filtered or shaped at each search operator, and then fed into the subsequent search operator. Because the piping of information from one search operator to another can be sequential, the order of the search operators in the search query can be important and can affect both results and performance. In some implementations, the order of the search operators in the search query can be adjusted automatically to optimize the overall processing performance without influencing the result of the search operation.

At 404, compute geolocations are identified. In some implementations, compute geolocations 306 includes computing resources available to the observability pipeline system. Each of the compute geolocations 306 may be distinct from the node geolocation 302 and the storage geolocation 304. In some instances, one or more compute geolocations 306 associated with the storage geolocation 304 may be identified. In certain instances, in response to the identified multiple storage geolocations 304, multiple sets of compute geolocations 306 can be identified for the respective multiple storage geolocations 304.

At 406, latency data are obtained. In some implementations, the latency data includes latency values for the identified compute geolocations 306. A latency value of an identified compute geolocation 306 can represents an efficiency of network communication between the identified compute geolocation 306 and the associated storage geolocation 304. The latency data may be obtained from memory, from a public or private database, from the identified compute geolocations 306, or from another source.

At 408, one of the identified compute geolocations is selected. In some implementations, one of the identified compute geolocations is selected based on the latency data and at least one preconfigured criterion. For example, a compute geolocation can be selected based on having the shortest distance or fastest network to the associated storage geolocation 304 or the shortest delay time for communicating data from the associated storage geolocation 304. In response to the search query requesting a search of data stored at multiple storage geolocations, multiple compute geolocations can be selected for executing the search query on the data stored at the multiple storage geolocations in parallel. In some instances, in response to the search query requesting a search of data stored at multiple storage geolocations, the same compute geolocation can be selected for executing the search query on the data stored at the multiple storage geolocations in series.

At 410, dynamic computing resources at the selected compute geolocations are initiated. In some implementations, a coordinator agent is configured at the node geolocation 302. In some implementations, the coordinator agent, as part of the observability pipeline system, is configured to communicate with a node residing at the selected compute geolocation. For example, the coordinator agent of the computer node transmits the search query to the selected compute node for executing the search query.

In some implementations, a dynamic computing resource at the selected compute geolocation is configured and initiated by the coordinator agent of the node geolocation 302 that is remote from the compute geolocation 306. In some implementations, the dynamic computing resource is configured to operate as a search engine to scan and process the data stored at the storage geolocation 304 according to the search query. In some implementations, the dynamic computing resource is initiated by receiving the search query from the computer node; and the search query is executed by the dynamic computing resource. In some instances, a dynamic computing resource includes Lambdas, on-demand containers, region-specific pre-warmed resources, or other types of computing resources. In some implementations, the dynamic computing resource is configured to generate the search results by scanning and processing the stored data from the storage geolocation 304, e.g., filtering aggregating enhancing, and other processing operations.

Initiating a dynamic computing resource is initiated at the selected compute geolocation causes the dynamic computing resource to search the stored data by configuring an observability pipeline process based on the search query and executing the observability pipeline process. When configuring the observability pipeline process, a data source storing the stored data for the observability pipeline process is defined and one or more pipelines to process the stored data at the data source according to respective operators of the search query. For example, the data source, pipelines, and other parameters of the observability pipeline process (e.g., the observability pipeline process 200 as shown in FIG. 2) are configured based on the received search query, and the dynamic computing resource on the selected compute geolocation 306 searches the stored data and produces the search results by executing the configured observability pipeline process.

In some instances, in response to the search query requesting a search of data stored at multiple storage geolocations, multiple dynamic computing resources at multiple compute geolocations 306 to perform data search at respective storage geolocations 304 may be configured and initiated by operation of the coordinator agent at the node geolocation 302.

At 412, search results are received. In some implementations, the search results are identified by the dynamic computing resource at the selected compute geolocation 306 and transmitted to the coordinator agent of the computer node at the node geolocation 302. For example, the search results may include the processed data (e.g., filtered, projected, and aggregated) which is much smaller than the data stored in the storage geolocation 304 before processing. The search results typically include a subset or representation of a subset of the stored data from the storage geolocation 304. The received results may be post-processed (e.g., aggregated or merged) at the node geolocation 302 before presenting the final results to the requester.

In certain instances, the data and buckets that store the data at the storage geolocation 304 may be owned by the customer; and the dynamic computing resources at the compute geolocations 306 are owned, maintained, and controlled remotely by the coordinator agent at the node geolocation 302. The coordinator agent may be configured to optimize the distribution of these dynamic computing resources based on costs and other factors.

Figure 5:
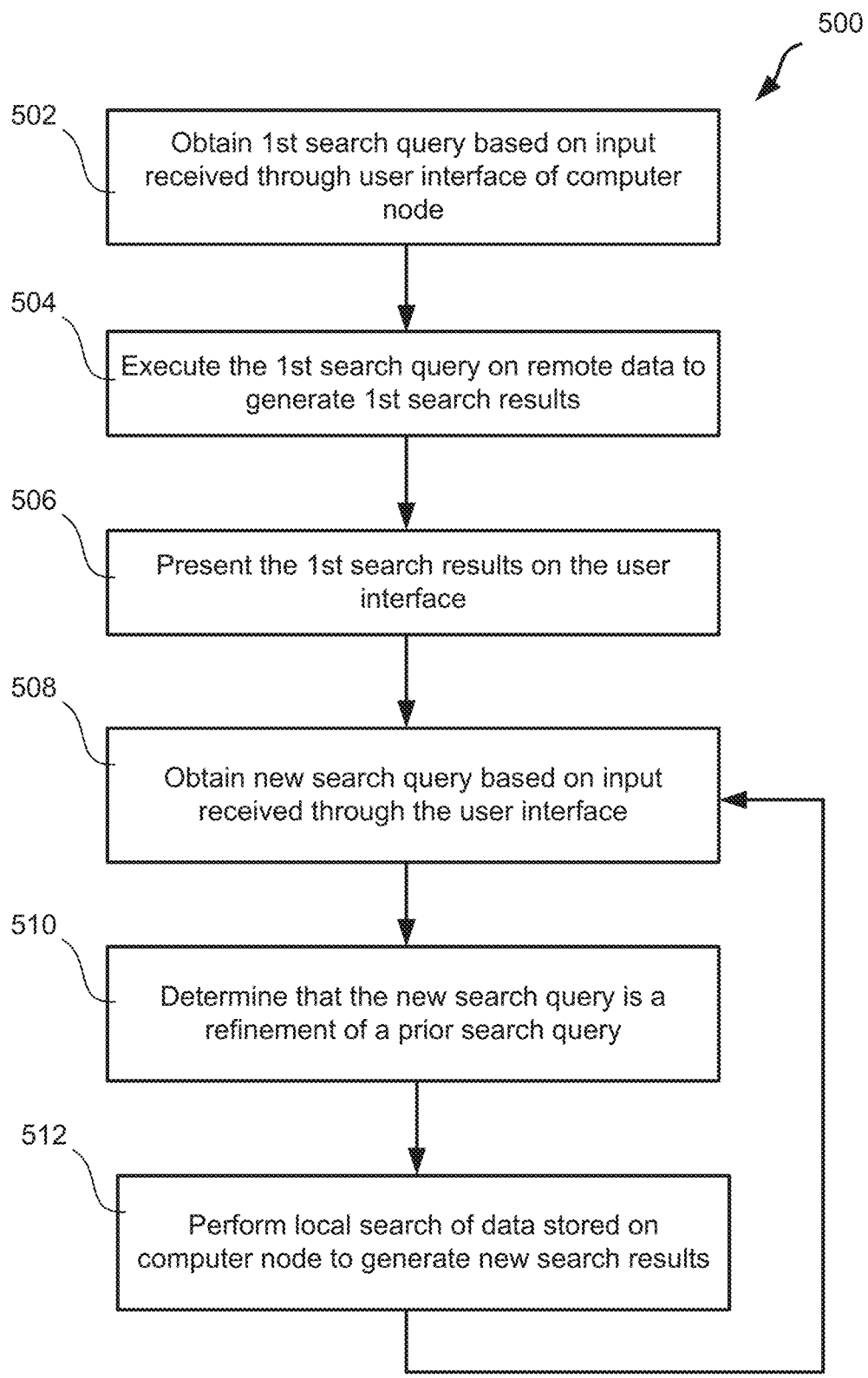
FIG. 5 is a flow chart showing aspects of an example search process.

FIG. 5 is a flow chart showing aspects of an example search process 500. In some implementations, the operations of the example process 500 are performed by operating a search engine on a computer node. The computer node is part of an observability pipeline system. The computer node may be performed at the leader role 112 or the worker role 114 of the observability pipeline system 110. The example process 500 may include additional or different operations, including operations performed by additional or different components, and the operations may be performed in the order shown or in another order.

At 502, a first search query is received at the computer node. For example, the first search query is based on input received through a user interface on the computer node at a node geolocation (e.g., the node geolocation 302). The first search query can request information about data stored at a storage geolocation, e.g., the storage geolocation 304. In some implementations, the storage geolocation is distinct from the node geolocation. In some implementations, the storage geolocation includes a cloud-based data storage system. The first search query includes a first set of search criteria (e.g., filters) that can be applied to the data at the storage geolocation 304 by processing at a compute geolocation 306 before returning partial results back to the node geolocation 302. In some implementations, the first search query also includes information about the storage geolocation where the data to be searched is stored. In certain implementations, the data stored at the storage geolocation includes observability pipeline output data generated by an observability pipeline system (e.g., the example pipeline output data 203 in FIG. 2), observability pipeline input data (e.g., the pipeline input data 201 in FIG. 2), or other data.

At 504, the first search query is executed on data remotely stored at the storage geolocation to generate first search results. In some instances, operation 504 may include operations 404, 406, 408, 410 and 412 in the example process 400 shown in FIG. 4 or in another manner. For example, once a compute geolocation is selected, the first search query can be transmitted, by operation of a coordinator agent configured at the computer node, from the node geolocation to the selected compute geolocation. The search can then be executed at the selected compute geolocation, for example, by a dynamic computing resource that configures and executes an observability pipeline process (e.g., the example observability pipeline process 200 shown in FIG. 2) based on the search query. Data at the storage geolocation can be remotely read and processed by the dynamic computing resource at the compute geolocation; and the first search results can be generated, which can be transmitted back to and stored on the computer node at the node geolocation, according to the example process 400 in FIG. 4.

At 506, the first search results are presented on the user interface of the computer node. In some implementations, the first search results are stored or cached locally at the node geolocation for later use. The first search results may be stored for a designated amount of time, until storage space is needed, until the first search results are considered outdated, until a session has ended, or until another event or trigger causes the first search results to be deleted. As an example, a user can search for all data stored at the storage geolocation or at multiple storage geolocations that contain terms "error" and "warning". The first search query is search 'error' or 'warning' in (datasetA); and the first search results from executing the first search query is resultA. The first search results resultA may include all log lines that include the terms 'error' or 'warning' or other information. In some implementations, the first search results resultA are transmitted to, stored at, and presented on the user interface at the node geolocation.

Figure 6A:
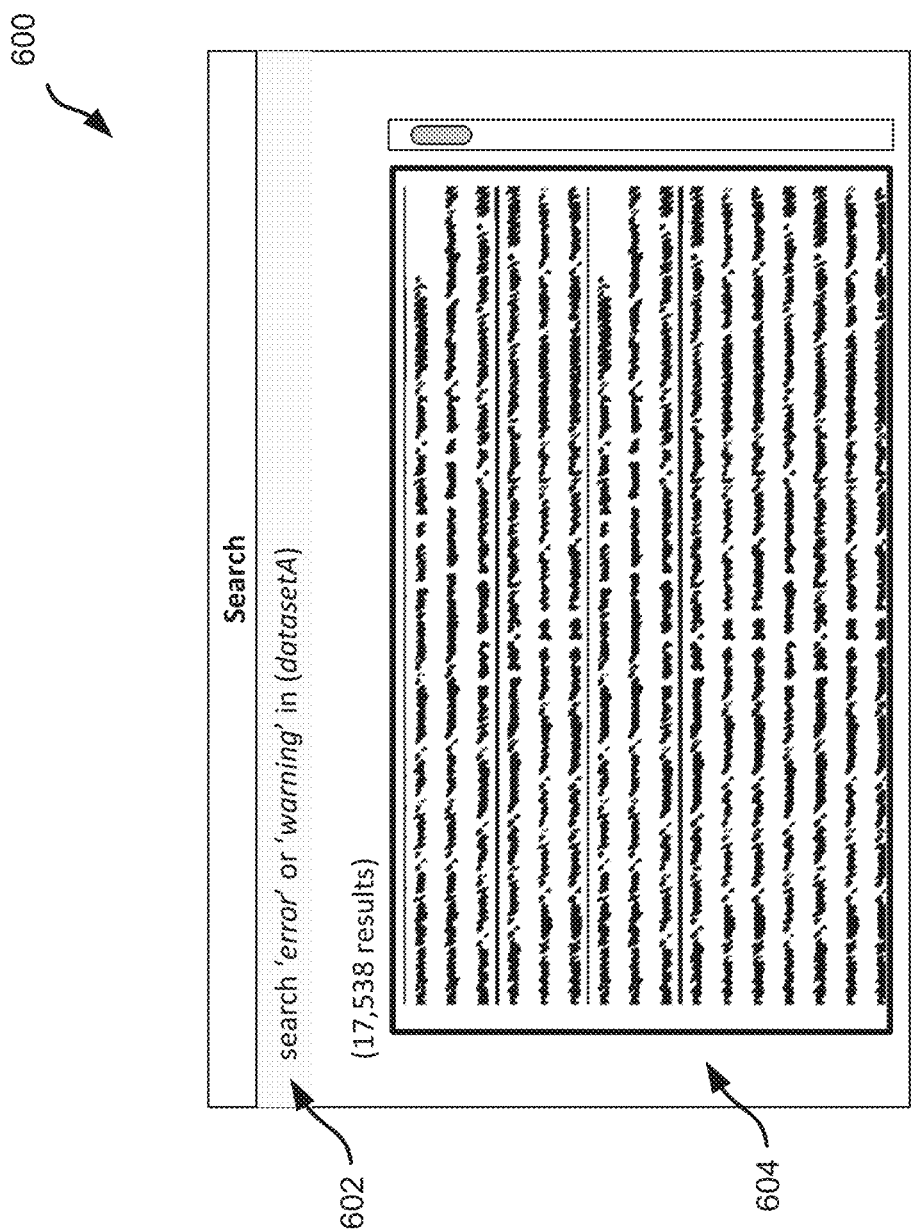
FIGS. 6A-6B are schematic diagrams showing aspects of an example user interface.

FIG. 6A is a schematic diagram showing aspects of an example user interface 600. The user interface 600 is on the computer node at the node geolocation. The user interface 600 includes a first search query 602 and first search results 604 obtained from the execution of the first search query 602 on the datasetA stored at the storage geolocation. As shown in FIG. 6A, the first search results 604 also shows the number of entries in the first search results, e.g., 17,538 results.

At 508, a new search query is obtained based on input received at the computer node through the user interface. In some implementations, the new search query is obtained after prior search results obtained from the execution of a prior search process have been presented on the user interface. In some instances, the new search query may be a refinement to a prior search query. For example, the new search query may be constructed based on the first search query and the first search results generated from executing the first search query. For example, the new search query may be constructed by adding one or more refinement criteria to the first search query through the user interface according to an input of a user. The refinement criteria may include, for example, filters, projections, transformations, or other operations applied to the first search query. In some implementations, the new search query includes a second set of search criteria.

At 510, whether the new search query is a refinement of a prior search query is determined. A prior search query may be the first search query or any subsequent search queries that have been executed prior the reception of the new search query. For example, when the new search query is a refinement of a prior search query within the same user session, the first set of search criteria in the prior search query is a subset of the second set of search criteria in the new search query. In other words, the new search query contains more limitations and thus is more restrictive compared to the prior search query within the same interactive search session. In some instances, whether the data remains unchanged (e.g., the same datasets, the same time range, etc.) and the prior search results from the prior search query are outdated can also be determined.

At 512, a local search is performed. In some implementations, in response to determining that the new search query is a refinement to the prior search query, a local search is performed by executing the new search query locally, by operation of the computer node at the node geolocation, on the stored search results from the prior search query. In some instances, the difference between the prior search query and the new search query can be determined by operation of the computer node at the node geolocation. In response to the first set of search criteria in the prior search query is a subset of the second set of search criteria in the new search query and prior search results from executing the prior search query is not outdated, the difference between the prior search query and the new search query is executed on the prior search results to generate new search results. In some instances, the new search results can also be materialized and stored for later use, e.g., as a basis for a next subsequent search query. In some implementations, the prior search results from the execution of the prior search query are a superset of the new search results from the execution of the new search query. In response to a determination that the first set of search criteria in the prior search query are not a subset of the second set of search criteria in the new search query or the first search results are outdated, the new search query can be executed on the data at the storage geolocation (e.g., performing operations in the example process 400 shown in FIG. 4 or in another manner).

Continuing with the example above, the user may add a filter for removing all non-HTTP logs (e.g., by filtering on source) from the result. The new search query is search 'error' or 'warning' in (datasetA)/where method in ('GET', 'POST'). This new search query is a refinement to the first search query. Instead of executing the new search query directly on the data storage at the storage geolocation by performing operations in the example process 400 shown in FIG. 4, the new search query can be executed locally at the node geolocation on the first search results. For example, by operation of the computer node at the node geolocation, a difference in the search criteria between the first search query and the new search query can be determined; and executed on the first search results by executing search in (resultA)/where method in ('GET', 'POST'); and the second search results, e.g., resultB, can be presented and stored at the computer node at the node geolocation.

Figure 6B:
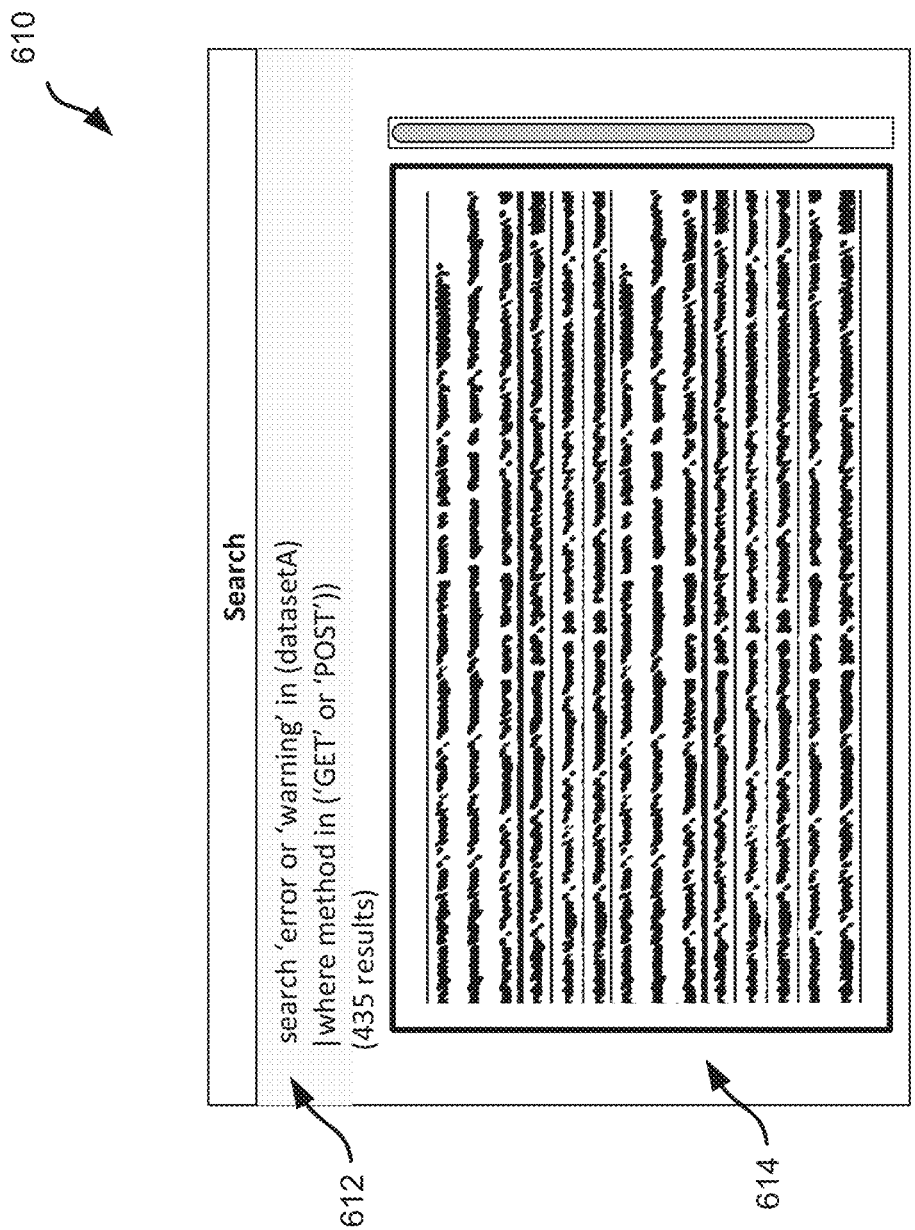

FIG. 6B is a schematic diagram showing aspects of an example user interface 610. The user interface 610 presents the new search query 612 and the new search results 614. As shown in FIG. 6B, the new search results 614 also shows the number of entries in the new search results, e.g., 435 results.

Continuing with the example above, if the user wants to know the counts across request methods (e.g., GET vs. POST) to narrow down the root cause of these issues, a third search query can be used: search 'error' or 'warning' in (datasetA)/where method in ('GET', 'POST')/summarize count( ) by method. This third search query is a refinement to the new search query and the first search query. Instead of executing the third search query on the data stored at the storage geolocation, a first subset of search criteria of the third search query can be executed on the first search results. For example, the first subset of the third query, which can be executed on the first set of results, is expressed as search in (resultA)/where method in ('GET', 'POST')/summarize count( ) by method, which can generate third search results (e.g., resultC). For another example, a second subset of search criteria of the third search query can be executed on the new search results. For example, the second subset of search criteria of the third search query is expressed as search in (resultB)/summarize count( ) by method, which can also generate the same third search results (e.g., resultC).

In some cases, operations 508, 510, 512 (and possibly other operations) are executed as an iterative process, where each iteration includes an execution of a new search query, which is a refinement to a prior search query. For example, after operation 610, a second new search query which is a refinement to one of the prior search queries can be further received and executed locally, by operation of the computer node, on the respective search results from the execution of the one of the prior search queries to generate second new search results.

Accordingly, the systems and techniques presented here can improve search speed and efficiency and reduce search costs since data does not have to be repeatedly scanned; and previously search results can be reused in some instances.

Figure 7:
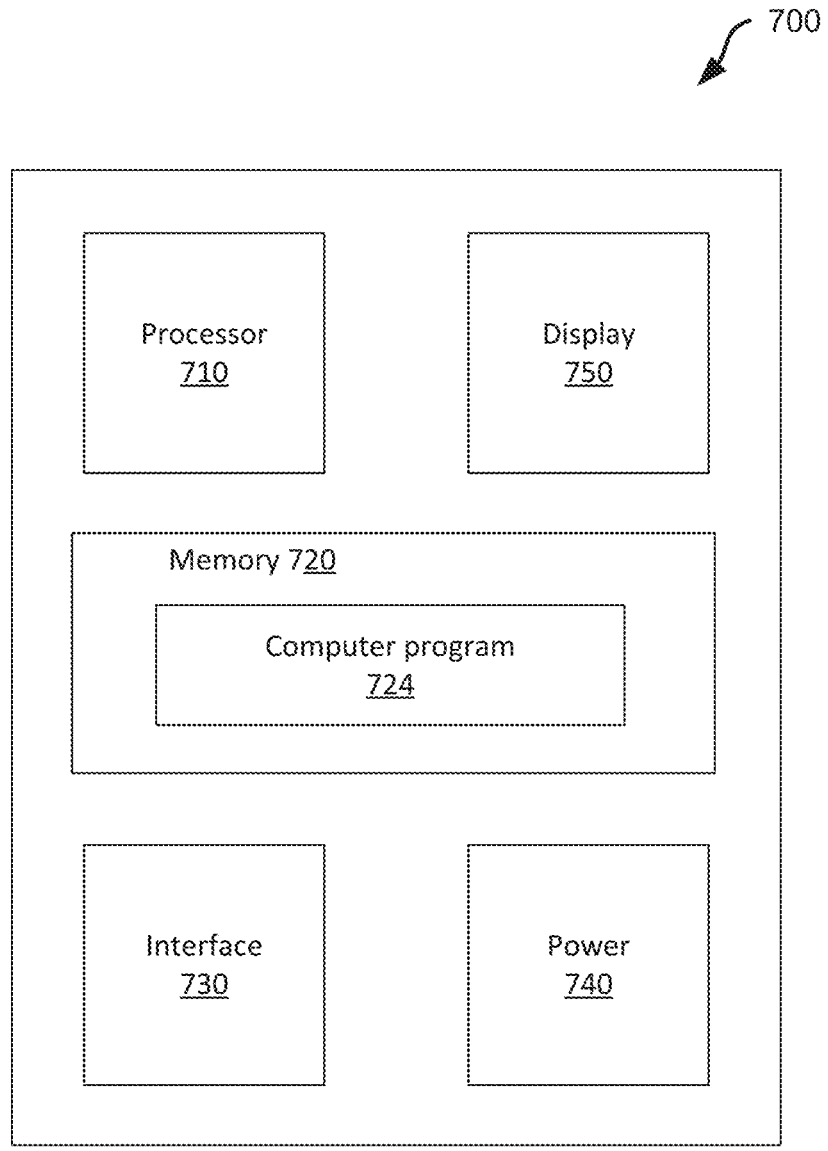
FIG. 7 is a block diagram showing an example computer system.

FIG. 7 is a block diagram showing an example computer system 700 that includes a data processing apparatus and one or more computer-readable storage devices. The term "data-processing apparatus" encompasses all kinds of apparatus, devices, nodes, and machines for processing data, including by way of example, a programmable processor, a computer, a system on a chip, or multiple ones, or combinations, of the foregoing, e.g., processor 710. The apparatus can include special-purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. In some implementations, the example computer system 700 may be implemented as computer nodes at the node geolocation 302, the storage geolocation 304, and the compute geolocations 306A, 306B, 306C in the observability pipeline system 300 in FIG. 3.

A computer program (also known as a program, software, software application, script, or code), e.g., computer program 724, can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors, e.g., processor 710, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, byway of example, both general and special purpose microprocessors, and processors of any kind of digital computer. Generally, a processor will receive instructions and data from a read-only memory or a random-access memory or both, e.g., memory 720. Elements of a computer can include a processor that performs actions in accordance with instructions, and one or more memory devices that store the instructions and data. A computer may also include or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media, and memory devices, including by way of example, semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

The example power unit 740 provides power to the other components of the computer system 700. For example, the other components may operate based on electrical power provided by the power unit 740 through a voltage bus or other connection. In some implementations, the power unit 740 includes a battery or a battery system, for example, a rechargeable battery. In some implementations, the power unit 740 includes an adapter (e.g., an AC adapter) that receives an external power signal (from an external source) and converts the external power signal to an internal power signal conditioned for a component of the computer system 700. The power unit 740 may include other components or operate in another manner.

To provide for interaction with a user, operations can be implemented on a computer having a display device, e.g., display 750, (e.g., a monitor, a touchscreen, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback. e.g., visual feedback, auditory feedback, or tactile feedback; and input from the user can be received in any form, including acoustic, speech, or tactile input. In addition, a computer can interact with a user by sending documents to, and receiving documents from, a device that is used by the user; for example, by sending web pages to a web browser on a user's client device in response to requests received from the web browser, or by sending data to an application on a user's client device in response to requests received from the application.

The computer system 700 may include a single computing device or multiple computers that operate in proximity or generally remote from each other and typically interact through a communication network, e.g., via interface 730. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship between client and server may arise by virtue of computer programs running on the respective computers and having a client-server relationship with each other.

The example interface 730 may provide communication with other systems or devices. In some cases, the interface 730 includes a wireless communication interface that provides wireless communication under various wireless protocols, such as, for example, Bluetooth, Wi-Fi, Near Field Communication (NFC), GSM voice calls, SMS, EMS, or MMS messaging, wireless standards (e.g., CDMA, TDMA, PDC, WCDMA, CDMA2000, GPRS) among others. Such communication may occur, for example, through a radio-frequency transceiver or another type of component. In some cases, the interface 730 includes a wired communication interface (e.g., USB, Ethernet) that can be connected to one or more input/output devices, such as, for example, a keyboard, a pointing device, a scanner, or a networking device such as a switch or router, for example, through a network adapter.

In a general aspect of what is described, searching functionality is provided in an observability pipeline system.

In a first example, a method of searching remotely-stored data includes receiving a search query at a computer node residing at a node geolocation, the search query representing a request to search stored data at a storage geolocation; identifying compute geolocations each including computing resources available to an observability pipeline system, each of the compute geolocations being distinct from the node geolocation and the storage geolocation; obtaining latency data including latency values for the compute geolocations, the latency value for each respective compute geolocation representing an efficiency of network communication between the storage geolocation and the respective compute geolocation; selecting one of the compute geolocations based on the latency data; by operation of a coordinator agent on the computer node, initiating a dynamic computing resource at the selected compute geolocation, initiating the dynamic computing causes the dynamic computing resource to search the stored data by: configuring an observability pipeline process based on the search query; and executing the observability pipeline process; and by operation of the coordinator agent on the computer node, receiving search results identified by the dynamic computing resource based on the search query.

Implementations of the first example may include one or more of the following features. The dynamic computing resource is configured to generate the search results at the selected compute geolocation based on performing a remote read of the stored data. The dynamic computing resource includes at least one of: a lambda; an on-demand container; or a region-specific pre-warmed resource. Initiating the dynamic computing resource includes transmitting the search query from the computer node at the node geolocation to the dynamic computing resource at the compute geolocation. Configuring the observability pipeline process includes defining a data source for the observability pipeline process; and configuring one or more pipelines to process the stored data according to respective operators of the search query. The data source includes the stored data.

Implementations of the first example may include one or more of the following features. The latency value for each respective compute geolocation represents a distance between the storage geolocation and the respective compute geolocation. The latency value for each respective compute geolocation represents a round trip ping time between the storage geolocation and the respective compute geolocation. The storage geolocation is a cloud-based data storage system, and each of the compute geolocations includes cloud-based computing resources that are available to the observability pipeline system.

Implementations of the first example may include one or more of the following features. The search query is a first search query based on input received through a user interface of the computer node, the search results are first search results, and the method further includes presenting at least a portion of the first search results on the user interface of the computer node; after presenting at least a portion of the first search results, obtaining a second search query based on input received through the user interface; determining that the second search query comprises a refinement of the first search query; and based on the second search query, performing a local search of data stored on the computer node, wherein the local search returns second search results that are a subset of the first search results. Performing the second search process includes applying one or more refinement criteria to the first search results to obtain second search results. The method includes presenting the second search results on the user interface of the computer node.

Implementations of the first example may include one or more of the following features. The method includes refining the search results by an iterative process, and each iteration of the iterative process includes obtaining a search query for the iteration; determining that the search query for the iteration comprises a refinement of a prior search query; and based on the search query for the iteration, performing a local search of data stored on the computer node to produce search results for the iteration, wherein the search results for the iteration are a subset of search results based on the prior search query. The store data includes observability pipeline output data generated by the observability pipeline system before the search query was generated. The stored data includes unstructured data collected by the observability pipeline system before the search query was generated.

In a second example, an observability pipeline system includes a coordinator agent running on a computer node residing at a node geolocation. The coordinator agent is configured to perform operations in the first example described above.

In a third example, a non-transitory computer-readable medium storing instructions that are operation when executed by data processing apparatus to perform operations in the first example described above.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method of searching remotely-stored data without needing to index or move all of the remotely-stored data, the method comprising:
    receiving a search query at a computer node located at a node geolocation relating to stored data stored at a storage geolocation, wherein the search query is received from a user device and the stored data includes data obtained from data source computing resources other than the user device;
    identifying computing resources available to an observability pipeline system for performing a data search, the computing resources associated with respective compute geolocations, each of the compute geolocations being distinct from the node geolocation and the storage geolocation;
    obtaining latency data comprising latency values for the compute geolocations, wherein a latency value of the latency values represents an efficiency of network communication between the storage geolocation and a compute geolocation of the compute geolocations;
    selecting one of the compute geolocations based on the latency data;
    by operation of a coordinator agent on the computer node, initiating a dynamic computing resource at the selected compute geolocation, wherein initiating the dynamic computing resource comprises transmitting the search query from the computer node at the node geolocation to the dynamic computing resource at the compute geolocation; and
    by operation of the coordinator agent on the computer node, receiving search results identified by the dynamic computing resource based on the search query,
    wherein the search results are obtained by the dynamic computing resource by:
        configuring an observability pipeline process based on the search query, and
        executing the observability pipeline process.

2. The method of claim 1, wherein the dynamic computing resource is configured to generate the search results at the selected compute geolocation based on performing a remote read of the stored data.

3. The method of claim 1, wherein the dynamic computing resource comprises at least one of:
    a lambda;
    an on-demand container; or
    a region-specific pre-warmed resource.

4. The method of claim 1, wherein configuring the observability pipeline process comprises:
    defining a data source for the observability pipeline process, wherein the data source comprises the stored data; and
    configuring one or more pipelines to process the stored data according to respective operators of the search query.

5. The method of claim 1, wherein the latency value for each respective compute geolocation represents a distance between the storage geolocation and the respective compute geolocation.

6. The method of claim 1, wherein the latency value for at least one compute geolocation represents a round trip ping time between the storage geolocation and the at least one compute geolocation.

7. The method of claim 1, wherein the storage geolocation includes a storage node in a cloud-based data storage system, and at least one of the computing resources comprise cloud-based computing resources that are available to the observability pipeline system.

8. The method of claim 1, wherein the search query is a first search query based on input received through a user interface, the search results are first search results, and the method comprises:
 presenting at least a portion of the first search results in the user interface;
 after presenting at least a portion of the first search results, obtaining a second search query based on input received through the user interface;
 determining that the second search query comprises a refinement of the first search query; and
 based on the second search query, performing a local search of data stored on the computer node, wherein the local search returns second search results that are a subset of the first search results.

9. The method of claim 8, wherein performing the local search comprises applying one or more refinement criteria to the first search results to obtain second search results.

10. The method of claim 8, comprising presenting the second search results on the user interface.

11. The method of claim 8, wherein the stored data is stored in a bucket at the storage geolocation and the stored data includes data that is not indexed, wherein the dynamic computing resource searches the stored data that is not indexed based on the search query.

12. The method of claim 1, comprising refining the search results by an iterative process, and an iteration of the iterative process comprises:
 obtaining a search query for the iteration;
 determining that the search query for the iteration comprises a refinement of a prior search query; and
 based on the search query for the iteration, performing a local search of data stored on the computer node to produce search results for the iteration, wherein the search results for the iteration are a subset of the search results based on the prior search query.

13. The method of claim 1, wherein the stored data comprises observability pipeline output data generated by the observability pipeline system before the search query was generated.

14. The method of claim 1, wherein the stored data comprises unstructured data collected by the observability pipeline system before the search query was generated.

15. The method of claim 1, wherein the stored data is stored in a bucket at the storage geolocation and the stored data includes data that is not indexed, wherein the dynamic computing resource searches the stored data that is not indexed based on the search query.

16. An observability pipeline system comprising a coordinator agent running on a computer node residing at a node geolocation, the coordinator agent being configured to perform operations comprising:
 receiving, from a user device, a search query representing a request to search stored data stored at a storage geolocation, wherein the stored data includes data obtained from data source computing resources other than the user device;
 identifying computing resources available to an observability pipeline system for performing a data search, the computing resources associated with respective compute geolocations, at least some of the compute geolocations being distinct from the node geolocation and the storage geolocation;
 obtaining latency data comprising latency values for the compute geolocations, wherein a latency value of the latency values represents an efficiency of network communication between the storage geolocation and a compute geolocation of the compute geolocations;
 selecting one of the compute geolocations based on the latency data;
 initiating a dynamic computing resource at the selected compute geolocation, wherein initiating the dynamic computing resource comprises transmitting the search query from the computer node at the node geolocation to the dynamic computing resource at the compute geolocation; and
 receiving search results identified by the dynamic computing resource based on the search query,
 wherein the search results are obtained by the dynamic computing resource by:
  configuring an observability pipeline process based on the search query, and
  executing the observability pipeline process.

17. The observability pipeline system of claim 16, comprising the dynamic computing resource, wherein the dynamic computing resource is configured to generate the search results at the selected compute geolocation based on performing a remote read of the observability pipeline stored data.

18. The observability pipeline system of claim 17, wherein the dynamic computing resource comprises at least one of:
 a lambda;
 an on-demand container; or
 a region-specific pre-warmed resource.

19. The observability pipeline system of claim 16, wherein configuring the observability pipeline process comprises:
 defining a data source for the observability pipeline process, wherein the data source comprises the stored data; and
 configuring one or more pipelines to process the stored data according to respective operators of the search query.

20. The observability pipeline system of claim 16, wherein the latency value for each respective compute geolocation represents a distance between the storage geolocation and the respective compute geolocation.

21. The observability pipeline system of claim 16, wherein the latency value for at least one compute geolocation represents a round trip ping time between the storage geolocation and the at least one compute geolocation.

22. The observability pipeline system of claim 16, wherein the storage geolocation includes a storage node in a cloud-based data storage system, and at least one of the computing resources comprise cloud-based computing resources that are available to the observability pipeline system.

23. The observability pipeline system of claim 16, wherein the search query is a first search query based on input received through a user interface, the search results are first search results, and the operations comprise:
 presenting at least a portion of the first search results in the user interface;

after presenting the first search results, obtaining a second search query based on input received through the user interface;

determining that the second search query comprises a refinement of the first search query; and based on the second search query, performing a local search of data stored on the computer node, wherein the local search returns second search results that are a subset of the first search results.

24. The observability pipeline system of claim 23, wherein performing the local search comprises applying one or more refinement criteria to the first search results to obtain second search results.

25. The observability pipeline system of claim 16, wherein the operations comprise refining the search results by an iterative process, and an iteration of the iterative process comprises:

obtaining a search query for the iteration;

determining that the search query for the iteration comprises a refinement of a prior search query; and based on the search query for the iteration, performing a local search of data stored on the computer node to produce search results for the iteration, wherein the search results for the iteration are a subset of the search results based on the prior search query.

26. A non-transitory computer-readable medium storing instructions that are operable when executed by data processing apparatus to perform operations comprising:

receiving a search query at a computer node located at a node geolocation relating to stored data stored at a storage geolocation, wherein the search query is received from a user device and the stored data includes data obtained from data source computing resources other than the user device;

identifying computing resources available to an observability pipeline system for performing a data search, the computing resources associated with respective compute geolocations, each of the compute geolocations being distinct from the node geolocation and the storage geolocation;

obtaining latency data comprising latency values for the compute geolocations, wherein a latency value of the latency values represents an efficiency of network communication between the storage geolocation and a compute geolocation of the compute geolocations;

selecting one of the compute geolocations based on the latency data;

by operation of a coordinator agent on the computer node, initiating a dynamic computing resource at the selected compute geolocation, wherein initiating the dynamic computing resource comprises transmitting the search query from the computer node at the node geolocation to the dynamic computing resource at the compute geolocation; and by operation of the coordinator agent on the computer node, receiving search results identified by the dynamic computing resource based on the search query, wherein the search results are obtained by the dynamic computing resource by:

configuring an observability pipeline process based on the search query, and executing the observability pipeline process.

\* \* \* \* \*